Fig. 4

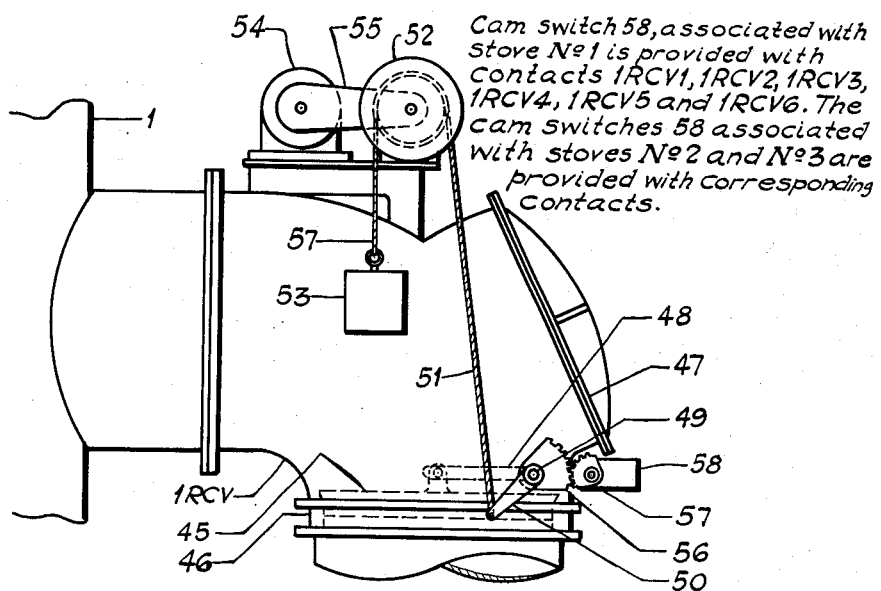

Cam switch 58, associated with Stove Nº1 is provided with Contacts 1RCV1, 1RCV2, 1RCV3, 1RCV4, 1RCV5 and 1RCV6. The Cam switches 58 associated with stoves Nº2 and Nº3 are provided with corresponding Contacts.

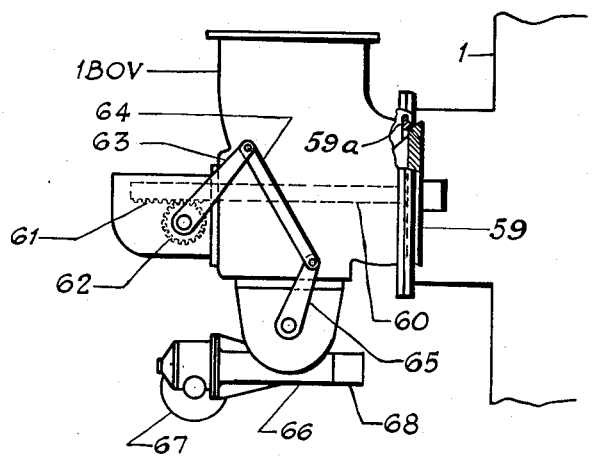

Fig. 5

Cam switch 68, associated with Stove Nº1 is provided with contacts 1BOV1, 1BOV2, 1BOV3, 1BOV4, 1BOV5 and 1BOV6. The cam switches 68 associated with stoves Nº2 and Nº3 are provided with corresponding contacts.

July 1, 1952 — O. R. RICE ET AL — 2,601,979
VALVE CONTROL SYSTEM FOR BLAST FURNACE STOVES
Filed Jan. 13, 1948 — 27 Sheets—Sheet 5

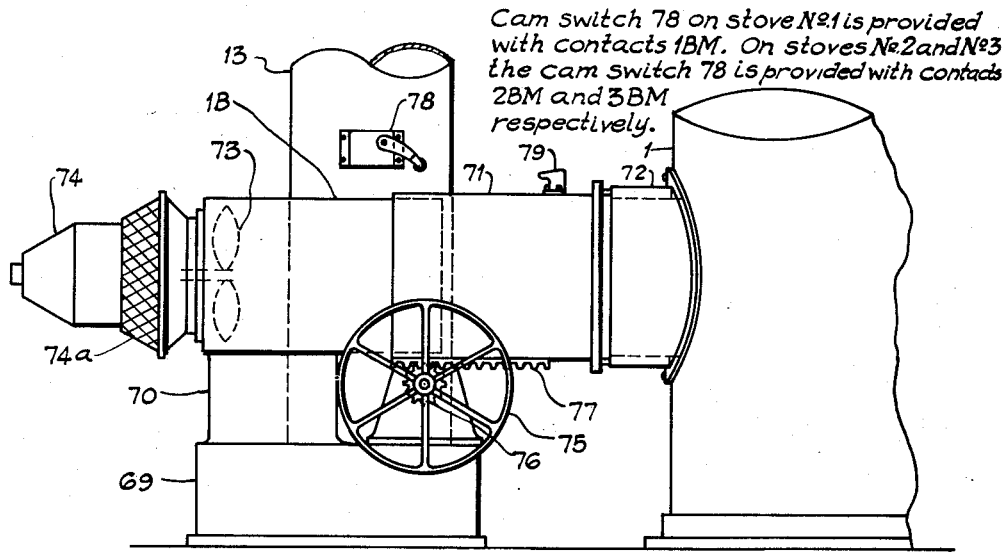

Cam switch 78 on stove N°1 is provided with contacts 1BM. On stoves N°2 and N°3 the cam switch 78 is provided with contacts 2BM and 3BM respectively.

Fig. 6

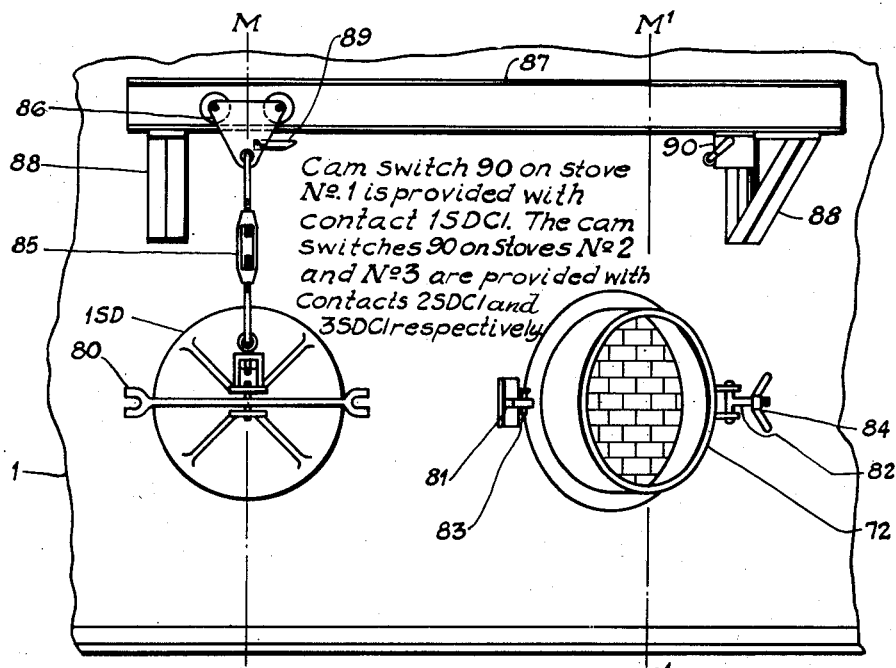

Cam switch 90 on stove N°1 is provided with contact 1SDC1. The cam switches 90 on stoves N°2 and N°3 are provided with contacts 2SDC1 and 3SDC1 respectively.

Fig. 7

INVENTOR.
Owen R. Rice
Arthur J. Whitcomb
BY
ATTORNEYS

July 1, 1952  O. R. RICE ET AL  2,601,979
VALVE CONTROL SYSTEM FOR BLAST FURNACE STOVES
Filed Jan. 13, 1948  27 Sheets-Sheet 8

INVENTOR.
Owen R. Rice
Arthur J. Whitcomb
BY
Wilkinson, Huxley, Byron + Hume
ATTORNEYS

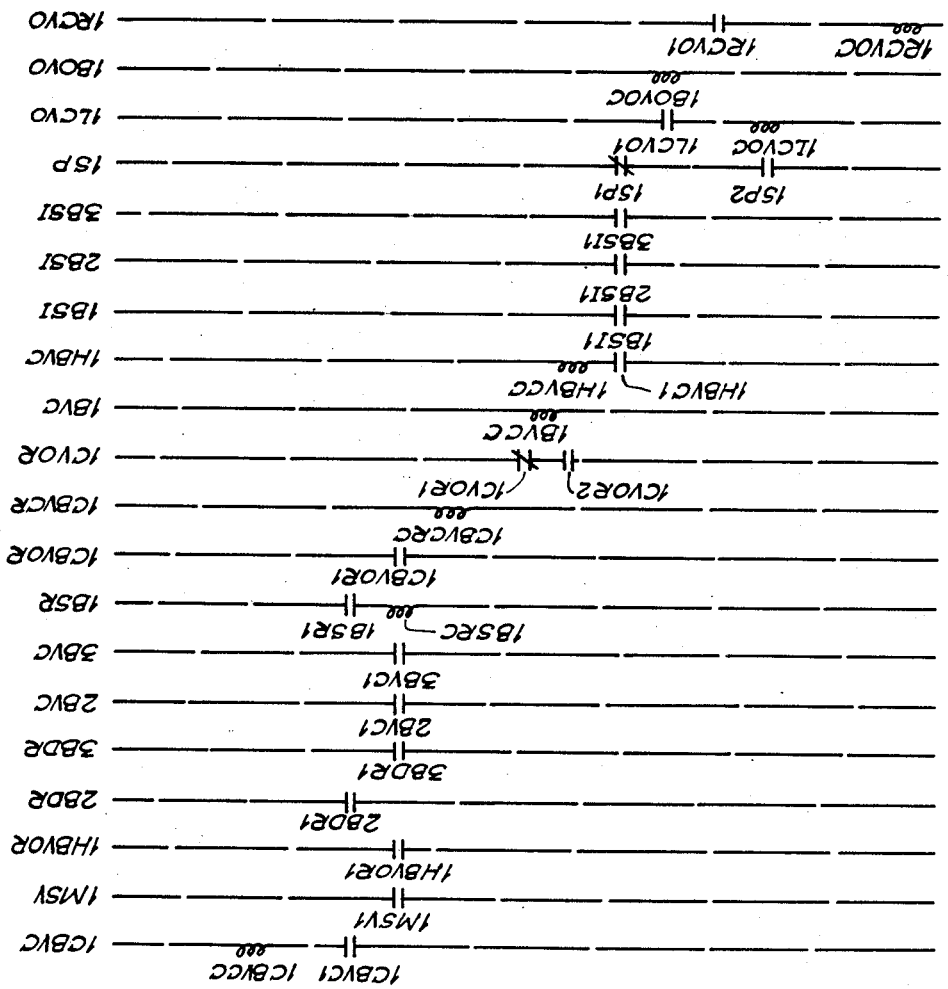
Fig. 13A1

July 1, 1952
O. R. RICE ET AL
2,601,979
VALVE CONTROL SYSTEM FOR BLAST FURNACE STOVES
Filed Jan. 13, 1948
27 Sheets-Sheet 13
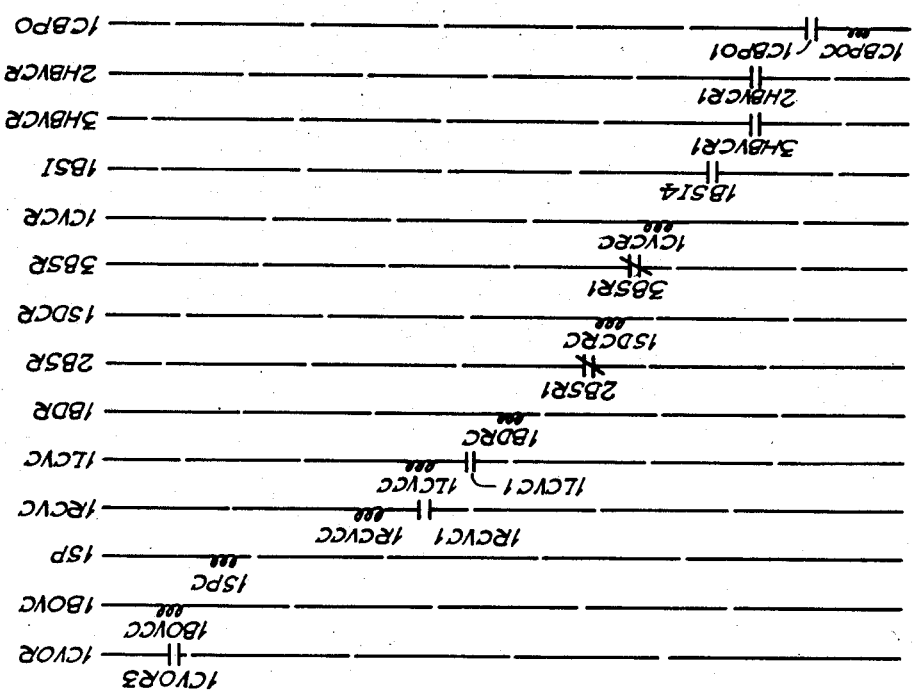
Fig.13B1
INVENTOR.
Owen R. Rice
Arthur J. Whitcomb
BY
ATTORNEYS INVENTOR.
Owen R. Rice
Arthur J. Whitcomb

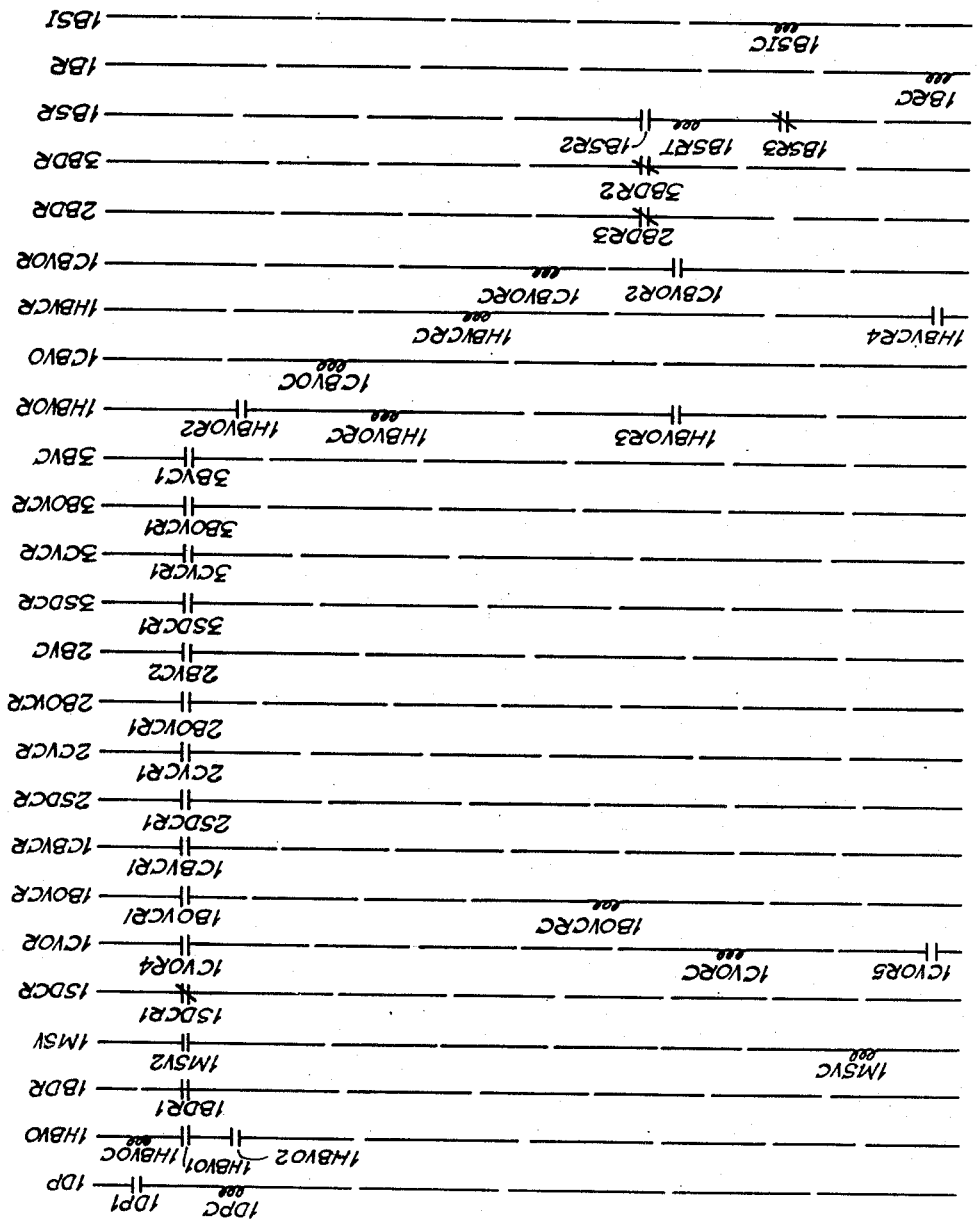
Fig.13C1

July 1, 1952     O. R. RICE ET AL     2,601,979

VALVE CONTROL SYSTEM FOR BLAST FURNACE STOVES

Filed Jan. 13, 1948     27 Sheets-Sheet 17

Fig. 14A1

INVENTOR.
Owen R. Rice
Arthur J. Whitcomb
BY
ATTORNEYS

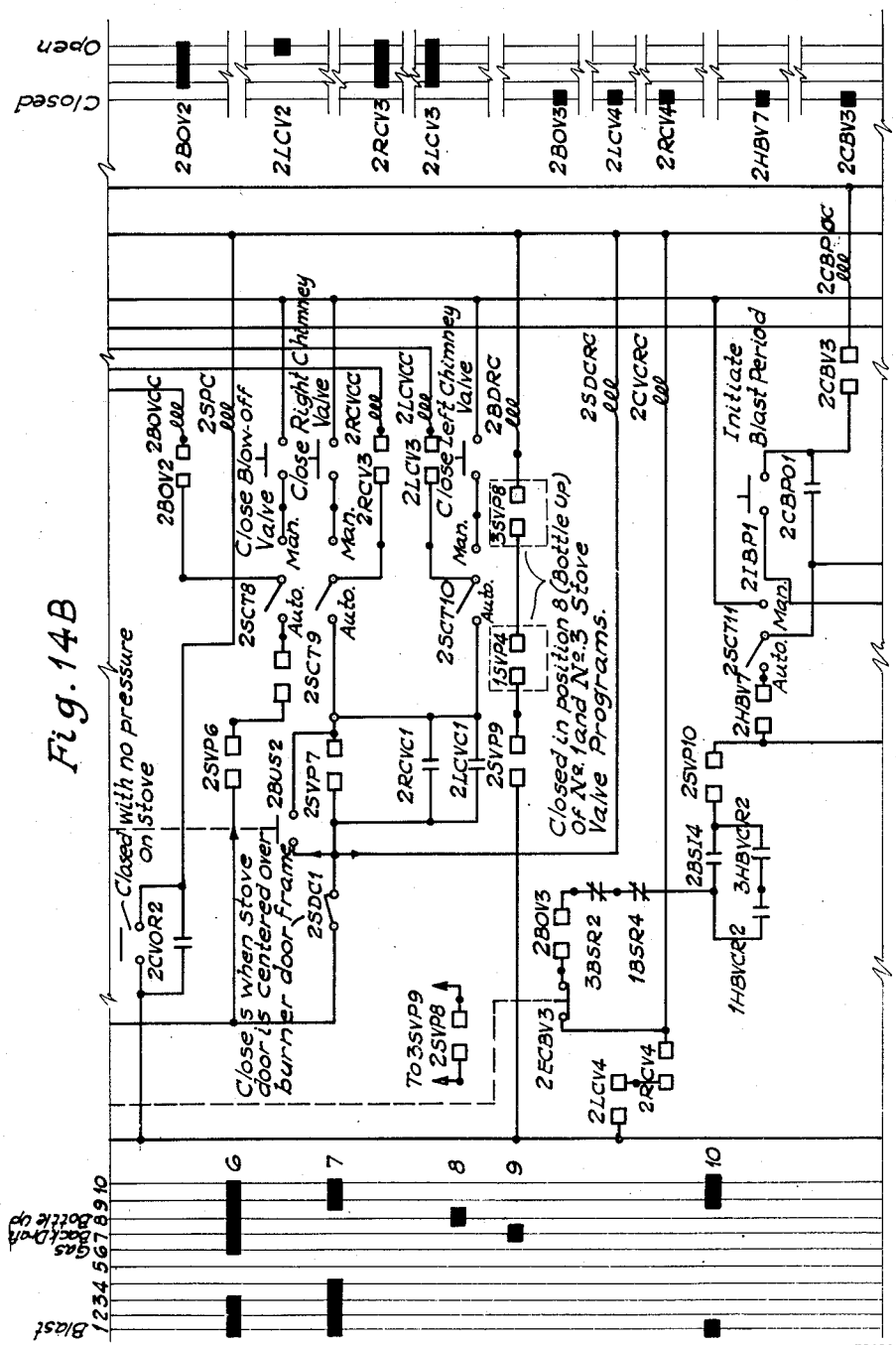

July 1, 1952     O. R. RICE ET AL     2,601,979
VALVE CONTROL SYSTEM FOR BLAST FURNACE STOVES
Filed Jan. 13, 1948     27 Sheets-Sheet 19

Fig. 14B1

INVENTOR.
Owen R. Rice
Arthur J. Whitcomb
BY
ATTORNEYS

July 1, 1952     O. R. RICE ET AL     2,601,979

VALVE CONTROL SYSTEM FOR BLAST FURNACE STOVES

Filed Jan. 13, 1948     27 Sheets-Sheet 21

Fig.14C1

INVENTOR.
Owen R. Rice
Arthur J. Whitcomb
BY
ATTORNEYS

July 1, 1952

O. R. RICE ET AL 2,601,979

VALVE CONTROL SYSTEM FOR BLAST FURNACE STOVES

Filed Jan. 13, 1948

INVENTOR.
Owen R. Rice
Arthur J. Whitcomb
BY
ATTORNEYS.

Fig. 15A1

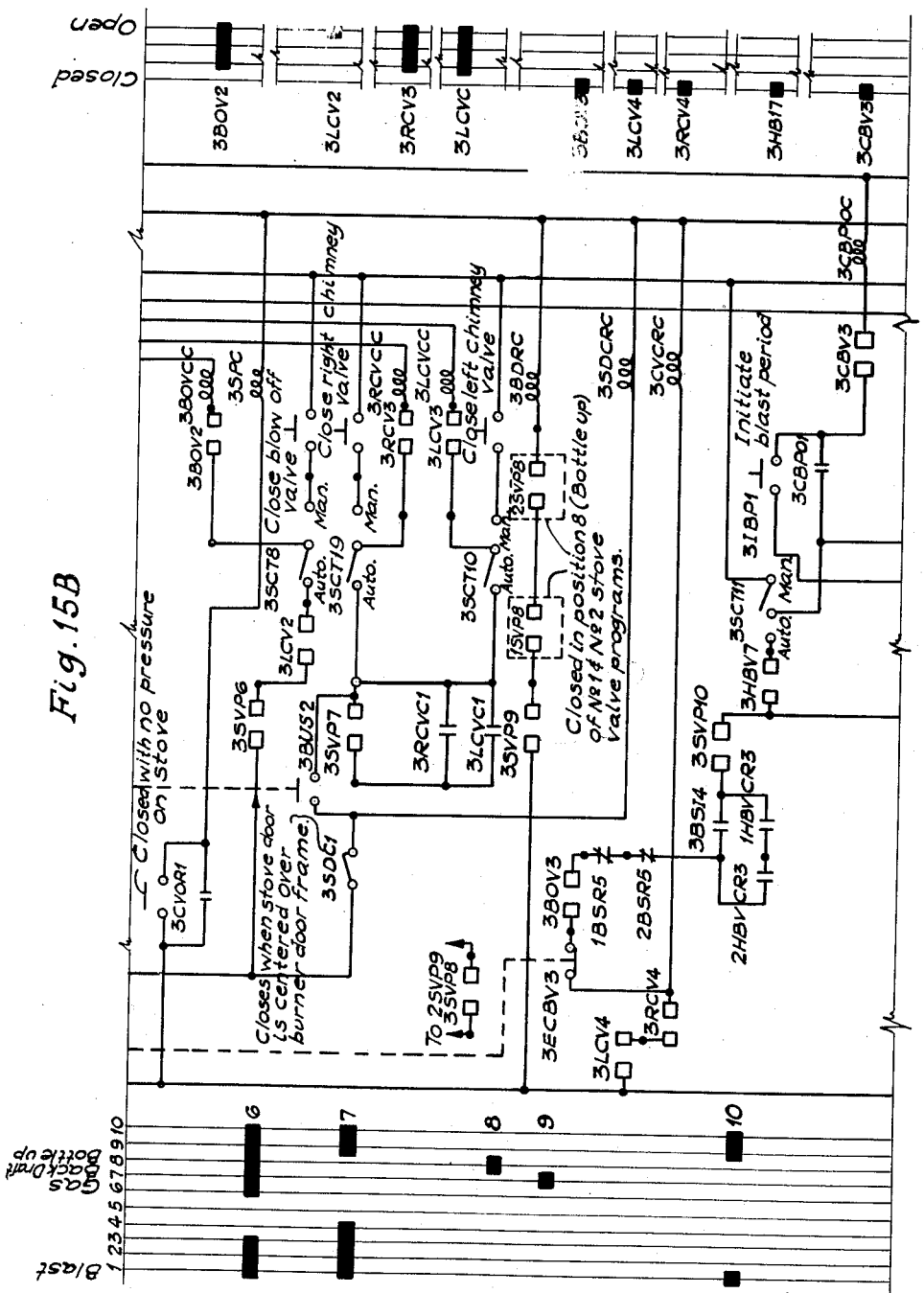

July 1, 1952
O. R. RICE ET AL
2,601,979
VALVE CONTROL SYSTEM FOR BLAST FURNACE STOVES
Filed Jan. 13, 1948
27 Sheets-Sheet 25
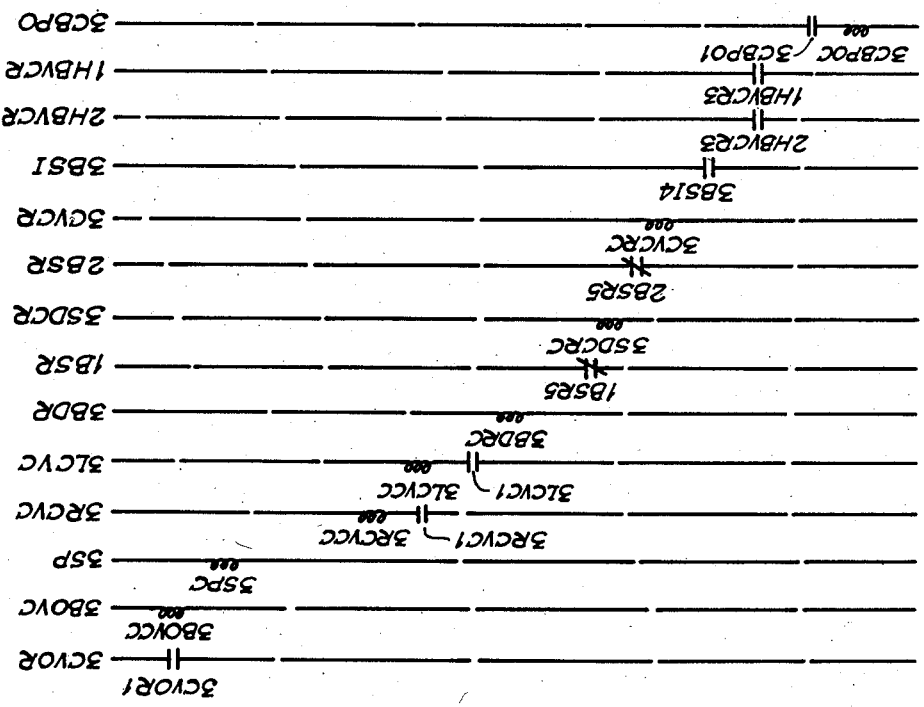
Fig. 15B1
INVENTOR.
Owen R. Rice
Arthur J. Whitcomb
BY
ATTORNEYS July 1, 1952

O. R. RICE ET AL 2,601,979

VALVE CONTROL SYSTEM FOR BLAST FURNACE STOVES

Filed Jan. 13, 1948

INVENTOR.
Owen R. Rice
Arthur J. Whitcomb
BY
Wilkinson, Huxley, Byron + Hume
ATTORNEYS.

Patented July 1, 1952

2,601,979

UNITED STATES PATENT OFFICE 2,601,979

VALVE CONTROL SYSTEM FOR BLAST FURNACE STOVES

Owen R. Rice and Arthur J. Whitcomb, Chicago, Ill., assignors, by mesne assignments, to Koppers Company, Inc., a corporation of Delaware Application January 13, 1948, Serial No. 2,066

24 Claims. (Cl. 263—19)

The present invention relates to improvements in valve operating mechanism.

More particularly, the present invention relates to automatic means for insuring the proper sequencing of the operations of the various valves in a blast furnace installation, particularly the valves relating to the stoves in such an installation.

Preliminary discussion of problem involved

A brief presentation of the problem may serve as a basis for a general understanding of the device. The functioning of blast furnace stoves may be divided into four different procedures; first, the procedure of changing stoves, that is, the putting of a fresh stove on blast and the exhausted stove on gas; second, the procedure of bottling up; third, the procedure of applying back-draft to the blast furnace through a stove; fourth, the procedure involving the use of the stoves for the emergency shut-off of the blast from the blast furnace. The purposes of the invention will be clarified as the description proceeds by citing the undesirable results either of failing to carry out the individual steps involved or of performing such steps incompletely or at the wrong time, any of which mispractices are possible and, in fact, do occasionally occur as a result of manual stove operation or as a result of stove operation as heretofore practiced.

First procedure—changing stoves

The working of a blast furnace is a continuous practice, not only in terms of substantially 24 hours' operation a day but in terms of permitting no cessation of the flow of blast at any moment except by prearrangement and specific preparation of the furnace for the stoppage. Said preparation ordinarily entails the drawing off of the molten contents of the hearth in the furnace to an extent which insures that the level of molten material shall be safely and positively below the level of the tuyères. Otherwise, with the flow of blast reduced or stopped, there is nothing to prevent the molten material at levels above the tuyères from running back into the tuyères, the blowpipes, the boot-legs and even into the bustle pipe wherein it would cool and solidify, thereby choking these parts against any further flow of blast until long and arduous cleaning or replacement of such parts has been effected. The drawing off of the molten contents of the blast furnace hearth is a periodically conducted item of furnace operation itself which has no direct relation to stove operation and which by no means should be subordinated thereto.

Therefore it is a peremptory requirement that at least one stove be connected so as to permit the through-flow of blast to the furnace at all times. It is axiomatic to those skilled in the art that at least one stove must be on blast at all times during which the blast furnace is expected to operate.

It follows then that in changing stoves the fresh stove must be put on blast completely before the exhausted stove is taken off blast.

Second procedure—bottling up

A stove may become sufficiently heated before its allotted gas period has expired or before the on-blast stove is exhausted as to its heat content. It is then the practice to discontinue gas-firing and to close up the stove so as to avoid as much as possible any loss of heat. This routine is known as bottling-up.

Third procedure—back-drafting

When the blast is taken off the blast furnace, there is still a certain amount of residual pressure within the furnace developed by the chemical reactions which proceed for a considerable period of time even without the presence of air. It is not infrequently required that repairs be made at such times, which involve the removal of a tuyère or tuyères or other parts, necessitating the opening up of the lower part of the furnace to atmosphere and the close approach of workmen to such openings. This approach is possible only if the residual pressure within the furnace is totally relieved, for otherwise hot gases or flames issue from such openings. Relief of this residual pressure is secured by establishing a continuous passage for the residual gases through those tuyères which are not removed or disconnected, these residual gases passing through the bustle pipe, the hot blast main, a stove (wherein combustion of the residual gases is caused to take place), the chimney valve or valves of that stove, and thence to the stove chimney. The residual gases thus have not only a channel of escape to the atmosphere in a harmless manner but indeed a preferential one since the stove chimney induces a draft. This practice is called back-drafting.

As the back-draft gases are very hot and also highly combustible, there are serious hazards attached to back-drafting if not conducted properly. These hazards reside in permitting unburned back-draft gas to find its way either into the cold blast main or to the stove chimney where in either case it may become associated with air and ignite with destructive fire or explosion. Wrecked blowing engines, cold blast mains and stove chimneys have resulted from improper back-drafting. Such instances have happened with sufficient frequency to classify this routine among the recognized hazards of blast furnace operation. These hazards are the ever possible consequence of human failure in the case of manual stove operation or of stove operation as heretofore conducted.

Fourth procedure—emergency blast shut-off

It has been pointed out that under normal conditions it is a grave mispractice to operate blast furnace stoves in such a way as to inadvertently shut off the flow of blast to the furnace before the equivalent valves on another stove are opened. However, there can arise a situation at a blast furnace which calls for exceptions to these stipulations. There are times when it is imperative that the blast be taken off. It is a case of choosing the lesser of two evils, the greater being a contingency such as a breakout at the furnace; that is an opening developing in the wall of a furnace such that, under continued pressure of the blast, hot material (solid, liquid or gaseous) would be ejected forcibly and with highly destructive effect. Under such a contingency it may be impossible to approach the normal means for shutting off the blast, namely, the operating mechanism of the snort valve, or that mechanism may have been rendered inoperable by the breakout. Shutting down of the blowing engine cannot be effected with the degree of alacrity demanded by the situation. The blast can be shut off, however, by closing the cold blast valve of the on-blast stove.

Objects

An object of the present invention is to provide improved mechanism for avoiding human errors, wasted time, and/or damage to equipment such as are now incident to stove operation in blast furnace installations.

A further object is to provide improved blast furnace mechanism to assure that there is always a stove in the on-blast position with respect to the furnace.

A further object is to provide means insuring safety in placing a stove in on-gas position.

A further object is to provide an improved mechanism for properly bottling up a stove in a blast furnace installation.

A further object is to provide improved blast furnace mechanism for insuring safe and proper back-drafting of a stove.

A further object is to provide improved means for emergency shut-off of the blast from a blast furnace in a blast furnace installation.

A further object is to provide a reliable automatic control for various mechanisms involved in the operation of a blast furnace stove installation.

A further object is to provide an improved automatic control for a blast furnace installation which will insure the proper sequencing of the steps incident to blast furnace stove operation.

A further object is to provide an improved automatic control of the instrumentalities commonly associated with the stoves of a blast furnace.

A further object is to provide an automatic control for the instrumentalities associated with the stoves of a blast furnace installation which control is well adapted for commercial service.

Further objects will appear as the description proceeds.

Brief description of the figures

Referring to the drawings;

Figure 4 is a view in side elevation of one of the chimney valves associated with the stoves as illustrated in Figure 1;

Figure 5 is a view in side elevation of one of the blow-off valves associated with the stoves as illustrated in Figure 1;

Figure 6 is a view in side elevation of one of the burners associated with the stoves illustrated in Figure 1;

Figure 7 is a view in front elevation of one of the stove doors for the stoves illustrated in Figure 1;

Figure 13B has common match lines with Figures 13A and 13C. Figures 13A1, 13B1 and 13C1 are explanatory charts associated respectively with Figures 13A, 13B and 13C. In said charts reference characters referring to various relays or contactors are noted adjacent to a margin, and broken lines lead from the reference characters to coils and contacts associated with the respective relays or contactors. The location of any of said coils and contacts in Figures 13A1, 13B1 and 13C1 provides a key to the location of the same coil or contact in the corresponding Figures 13A, 13B and 13C.

Figure 14A:
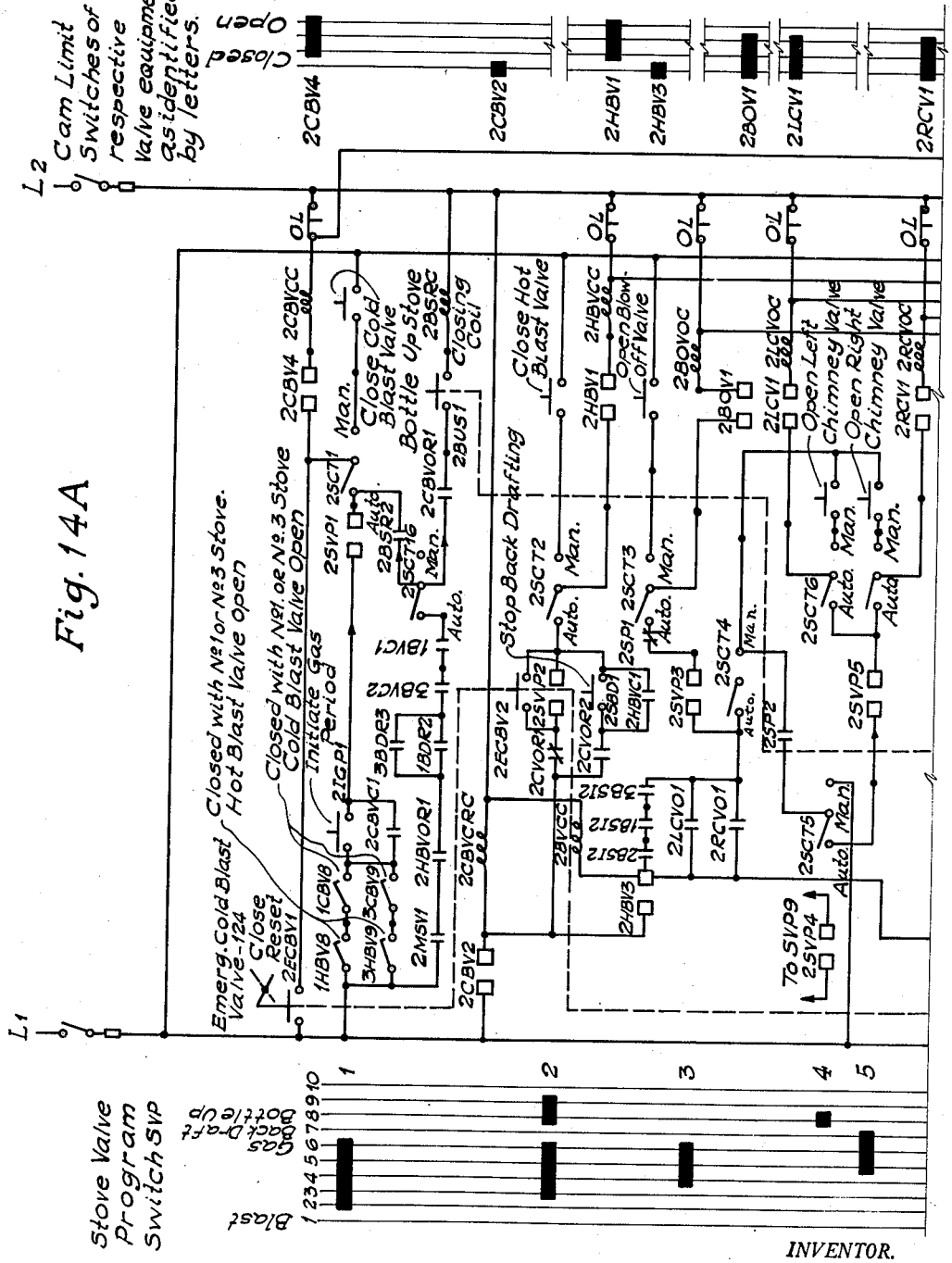
Figure 14C:
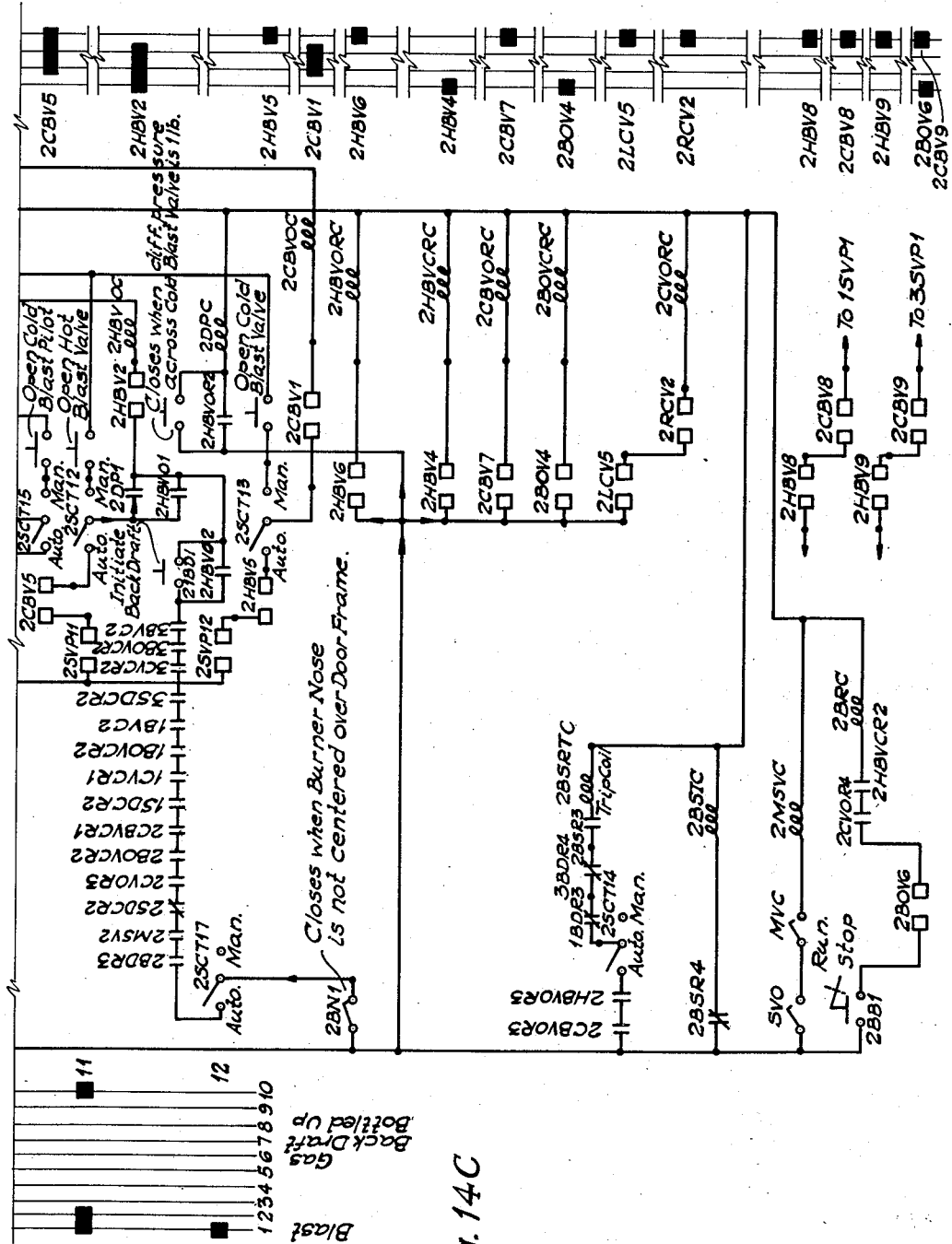

Figures 14A, 14B and 14C are matching parts of a circuit diagram illustrating the electrical connections between the master panel (Figures 10 and 11) and various limit switches or cam switches in the instrumentalities associated with the No. 2 stove. Figure 14B has common match lines with Figures 14A and 14C. Figures 14A1, 14B1 and 14C1 are explanatory charts associated, respectively, with Figures 14A, 14B and 14C. In said charts reference characters referring to various relays or contactors are noted adjacent to a margin and broken lines lead from the reference characters to coils and contacts associated with the respective relays. The location of any of said coils and contacts in Figures 14A1, 14B1 and 14C1 provides a key to the location of the same coil or contact in the corresponding Figures 14A, 14B and 14C.

Figure 15A1:
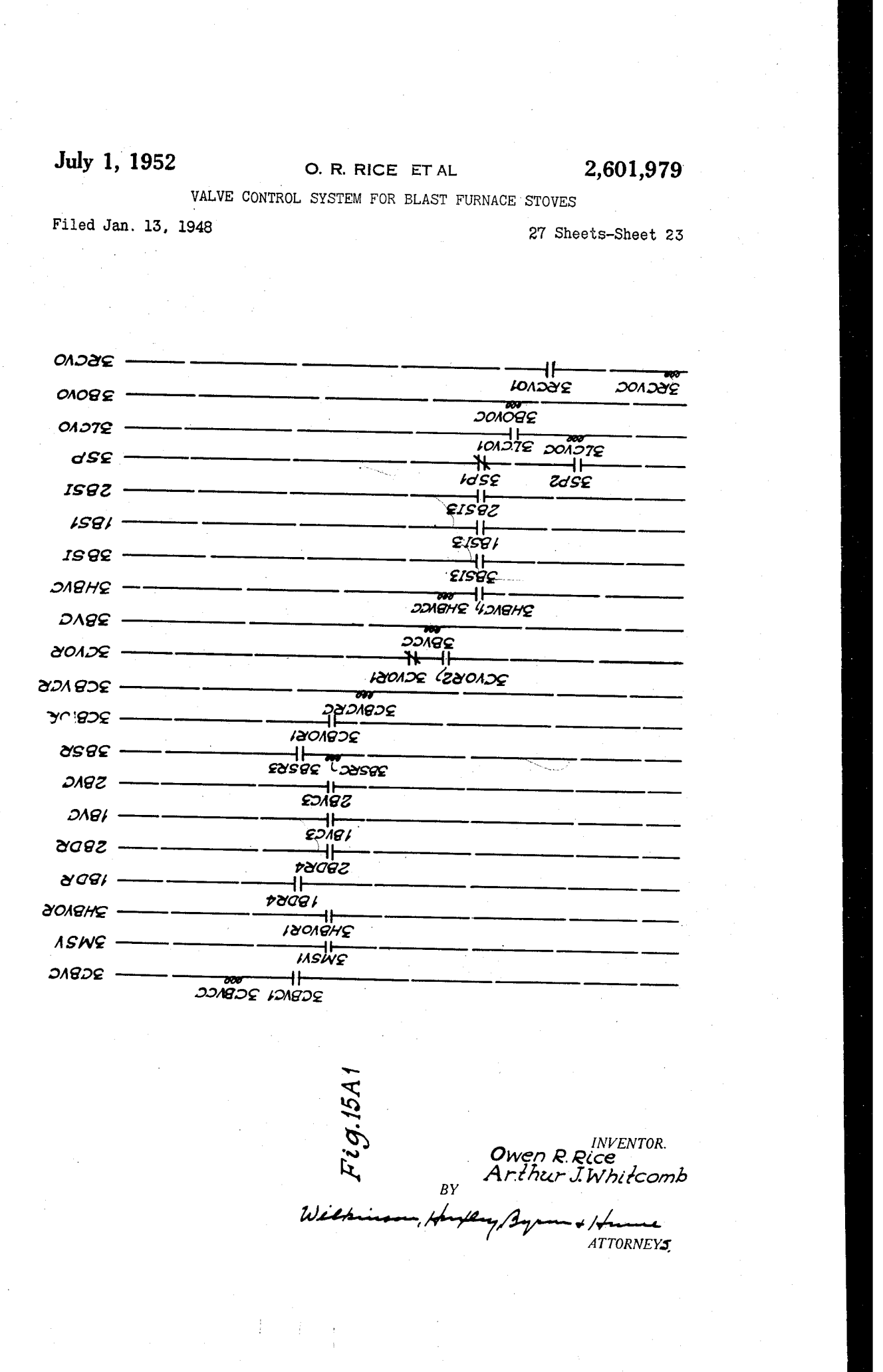
Figure 15C:
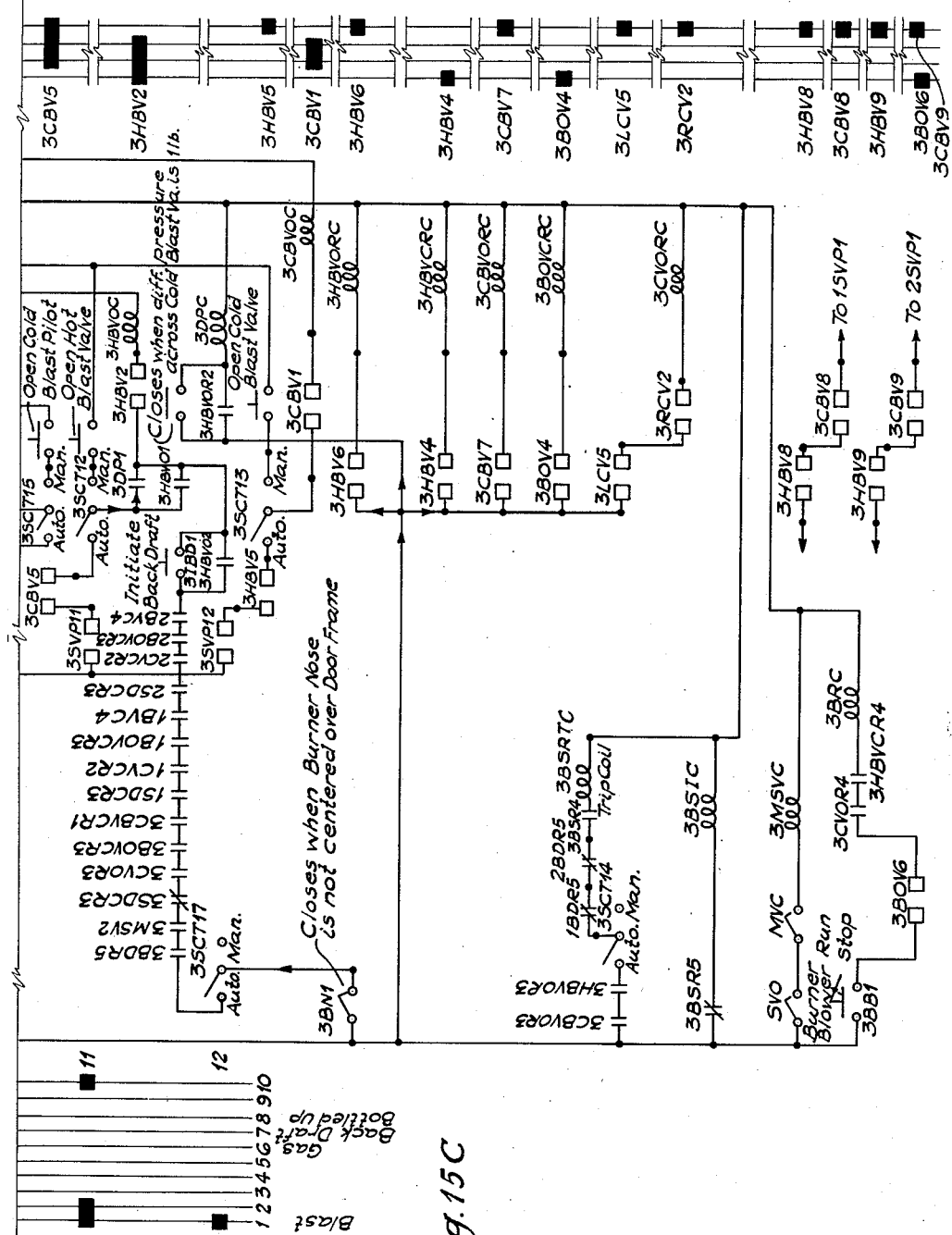

Figures 15A, 15B and 15C are matching parts of a circuit diagram illustrating the electrical connections between the master panel (Figures 10 and 11) and various limit switches or cam switches in the instrumentalities associated with the No. 3 stove. Figure 15B has common match lines with Figures 15A and 15C. Figures 15A1, 15B1 and 15C1 are explanatory charts associated respectively with Figures 15A, 15B and 15C. In said charts reference characters referring to various relays or contactors are noted adjacent to a margin and broken lines lead from the reference characters to coils and contacts associated with the respective relays or contactors. The location of any of said coils and contacts in Figures 15A1, 15B1 and 15C1 provides a key to the location of the same coil or contact in the corresponding Figures 15A, 15B and 15C.

*Description of mechanical parts illustrated in Figures 1 to 11, inclusive*

Figure 1:
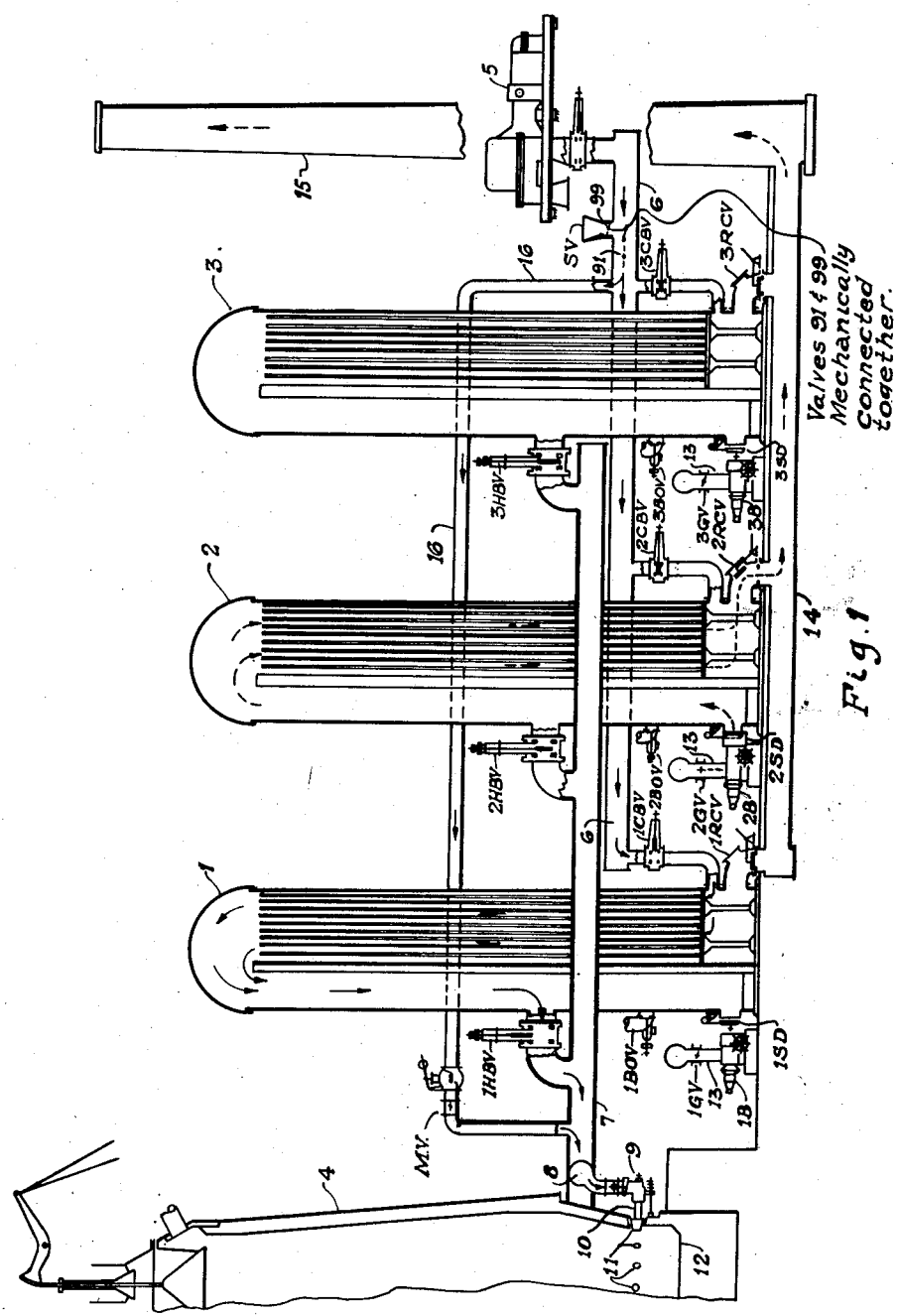
Figure 1 is a diagrammatic view illustrating a battery of three stoves and a blast furnace together with connecting mains and valves associated therewith.

Figure 1 illustrates a battery of hot blast stoves designated by the numerals 1, 2 and 3 serving a blast furnace 4. A blowing engine 5 delivers air to the stoves through the cold blast main 6.

Hot blast from a stove 1, 2 or 3 passes through the hot blast main 7, bustle pipe 8, boot-legs 9, blow-pipes 10 and tuyères 11 into the furnace 4. Molten iron and slag, the result of blast furnace operation, collect in the hearth 12.

The stoves 1, 2 and 3 are heated with gas from a gas main having the branches 13, 13. Products of combustion are conducted from said stoves through the flue 14 to the chimney 15. The temperature of the hot blast is tempered to suit conditions by means of cold blast delivered from the cold blast main 6 through the by-pass main 16 which forms a direct connection between said cold blast main 6 and the hot blast main 7.

The valves and accessories on the three stoves 1, 2 and 3 are denoted by the following symbols in which the prefixed numerals refer to the respective stoves.

| | | | |
|---|---|---|---|
| 1HBV | 2HBV | 3HBV | Indicate hot blast valves. |
| 1CBV | 2CBV | 3CBV | Indicate cold blast valves, having pilot valves 1CBP, 2CBP, 3CBP respectively. |
| 1RCV | 2RCV | 3RCV | Indicate right-hand chimney valves. |
| 1LCV | 2LCV | 3LCV | Refer to left-hand chimney valves (not shown in Figure 1). |
| 1BOV | 2BOV | 3BOV | Indicate blow-off valves. |
| 1GV | 2GV | 3GV | Indicate gas valves. |
| 1B | 2B | 3B | Indicate gas burners. |
| 1SD | 2SD | 3SD | Indicate stove doors i. e. burner-stove communication shut-offs. |

SV indicates a snort valve.
MV indicates a mixer valve.

The flow of blast air is indicated by full arrows in Figure 1. The flow of gas and products of combustion is indicated by broken arrows. As depicted in Figure 1, stove No. 1 is on blast, that is, air blast is entering it cold and leaving it heated up; stove No. 2 is on gas, that is, gas is being burned in it so as to prepare it for its time on blast; stove No. 3 is bottled up, that is, it is neither on blast nor on gas, and all its valves are closed so as to minimize the loss of heat.

Figure 2:
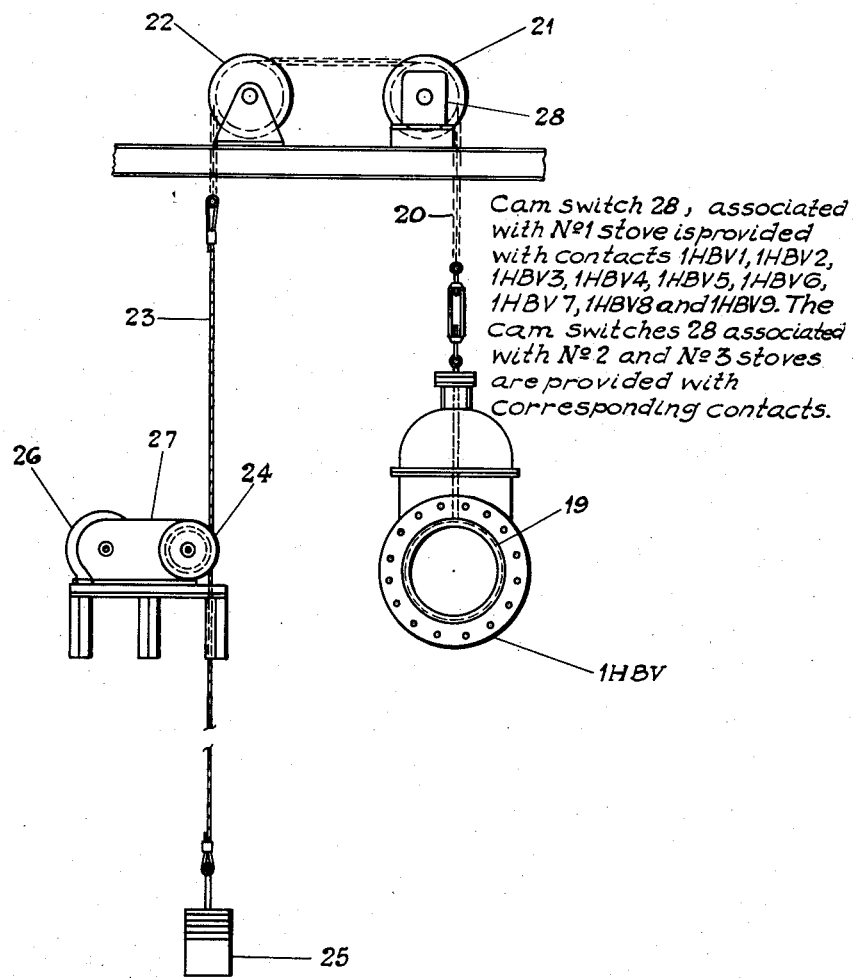
Figure 2 is a diagrammatic view of one of the hot blast valves associated with the stoves as illustrated in Figure 1.

Figure 2 is a view in elevation of any one of the hot blast valves (for instance 1HBV attached to stove No. 1) together with the operating mechanism for said valve. The hot blast valve illustrated in Figure 2 includes the valve gate 19 which is raised or lowered (opened or shut) by means of the chain 20 running over the sheaves 21, 22 and connected to the cable 23 which is wrapped around the drum 24 and thence hangs downwardly to suspend the counterweight 25. The drum 24 is mechanically connected to the motor 26 through the speed reducer 27. A multipole cam switch 28 is moved in response to the rotation to the sheave 21. Said cam switch 28 is provided with a number of contacts 1HBV1, 1HBV2, 1HBV3, 1HBV4, 1HBV5, 1HBV6, 1HBV7, 1HBV8, 1HBV9. As above noted, the prefix 1 indicates that the corresponding instrumentality is associated with stove No. 1. Stove No. 2 will have associated therewith the hot blast valve 2HBV and the cam switch 28 thereof will have contacts 2HBV1, 2HBV2, 2HBV3, 2HBV4, 2HBV5, 2HBV6, 2HBV7, 2HBV8, 2HBV9. Stove No. 3 will have associated therewith hot blast valve 3HBV and the cam switch 28 thereof will be provided with contacts 3HBV1, 3HBV2, 3HBV3, 3HBV4, 3HBV5, 3HBV6, 3HBV7, 3HBV8, 3HBV9.

Figure 3:
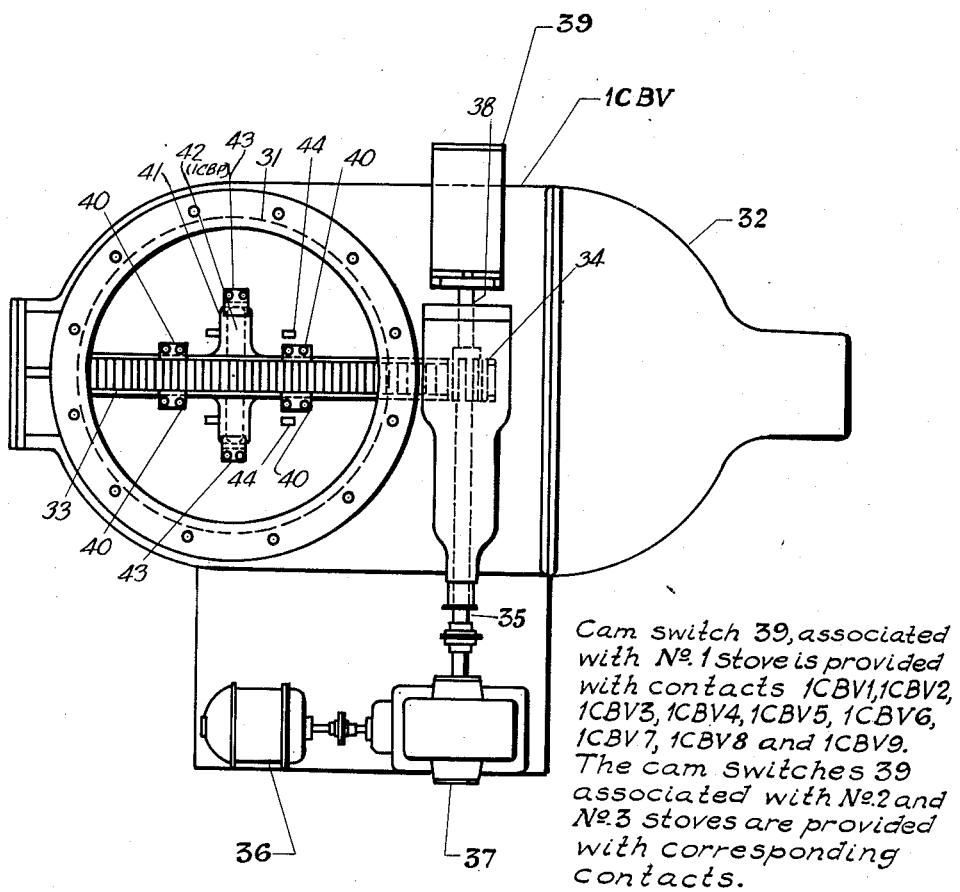
Figure 3 is a top plan view of one of the cold blast valves associated with stoves illustrated in Figure 1.

Figure 3 is a top plan view of any one of the cold blast valves (for example 1CBV attached to stove No. 1) together with the operating mechanism for said cold blast valve. The gate 31 of said cold blast valve is shown in closed position. When in its open position, said gate 31 is located to the right in Figure 3 and resides within the bonnet 32 of said valve. Movement of gate 31 is accomplished by means of the rack 33 and the pinion 34, said pinion being fixed to the shaft 35 driven by the motor 36 through the speed reducer 37. An extension 38 of the shaft 35 actuates the multipole cam switch 39. The cam switch associated with the cold blast valve 1CBV attached to stove No. 1 has the plurality of contacts 1CBV1, 1CBV2, 1CBV3, 1CBV4, 1CBV5, 1CBV6, 1CBV7, 1CBV8, 1CBV9. Stove No. 2 will be provided with a cold blast valve 2CBV, the multipole cam switch 39 of which has the plurality of contacts 2CBV1, 2CBV2, 2CVB3, 2CVB4, 2CBV5, 2CBV6, 2CVB7, 2CVB8, 2CVB9. Stove No. 3 will be provided with the cold blast valve 3CVB1, the multipole cam switch 39 of which will be provided with the plurality of contacts 3CVB1, 3CBV2, 3CBV3, 3CVB4, 3CBV5, 3CBV6, 3CBV7, 3CBV8, 3CBV9.

Preferably the rack 33 has a lost motion connection with the gate 31. In other words, the rack 33 is not fixed to the gate 31 but slides laterally in guides 40, 40 which are fixed to the gate 31. A pilot plate 41 is attached to the rack 33 and covers a pilot port 42 which is a slot-like opening in the gate 31. The pilot plate 41 is held in sliding contact with the gate 31 by means of the guides 43, 43 which are fixed to the gate 31. Initial movement of the rack 33 causes the pilot plate 41 to move laterally uncovering the pilot port 42, such movement continuing until the pilot plate 41 makes contact with the lugs 44 which are fixed to the gate 31. Further movement of the rack 33 causes an accompanying movement of gate 31. This lost motion connection is common practice in cold blast valves. The combination of port 42 and plate 41 constitutes the pilot valve 1CBP, 2CBP or 3CBP.

Figure 4 is a view in side elevation of any one of the chimney valves (for instance, 1RCV attached to stove No. 1) together with the operating mechanism for said chimney valve. The numeral 45 indicates a valve disc illustrated in closed position in contact with the valve seat 46. When in open position the valve disc 45 resides in the bonnet 47 of the valve. Movement of the valve disc 45 onto the seat 46 or into the bonnet 47 is accomplished by means of the suspension arm 48 keyed to the shaft 49 which is rigidly connected at its other end to the crank arm 50 which in turn is moved by the cable 51, a portion of which is wrapped around the drum 52 and thence hangs downwardly to suspend the counterweight 53. The cable drum 52 is mechanically connected to the motor 54 through the speed reducer 55.

Keyed to the shaft 49 is the segmental gear 56 meshing with a matching segmental gear 57, keyed to the shaft of the multipole cam switch 58. Thus the positioning of the valve disc 45 results in a corresponding positioning of the cam switch 58. The cam switch 58 associated with stove No. 1 is provided with contacts 1RCV1, 1RCV2, 1RCV3, 1RCV4, 1RCV5, 1RCV6.

Stove No. 2 is provided with a chimney valve 2RCV, the cam switch 58 of which is provided with contacts 2RCV1, 2RCV2, 2RCV3, 2RCV4, 2RCV5, 2RCV6.

Stove No. 3 is provided with the chimney valve 3RCV, the cam switch 58 of which will be provided with contacts 3RCV1, 3RCV2, 3RCV3, 3RCV4, 3RCV5, 3RCV6.

Figure 5 is a view in side elevation of any one of the blow-off valves (for instance, 1BOV attached to stove No. 1) together with the operating mechanism for said blow-off valve. The valve disc 59 which engages for closure of said blow-off valve with seat 59a is attached to the stem 60 and is given reciprocal motion for opening and closing by means of the rack 61 (which is part of the stem 60) and the meshing pinion 62. Keyed to the shaft of the pinion 62 is the crank arm 63 having at its outer end the link 64 which connects to the crank arm 65. The latter is keyed to the driving shaft of the speed reducer 66 which is connected to the motor 67. An extension of the speed reducer 66 gives rotary motion to the multipole cam switch 68. The cam switch 68 of the blow-off valve 1BOV attached to stove No. 1 is provided with the contacts 1BOV1, 1BOV2, 1BOV3, 1BOV4, 1BOV5, 1BOV6. Stove No. 2 will be provided with a blow-off valve 2BOV, the multipole cam switch 68 thereof being provided with the contacts 2BOV1, 2BOV2, 2BOV3, 2BOV4, 2BOV5, 2BOV6. Stove No. 3 will be provided with the blow-off valve 3BOV, the cam switch 68 thereof having contacts 3BOV1, 3BOV2, 3BOV3, 3BOV4, 3BOV5, 3BOV6.

Figure 6 is a view in side elevation of any one of the burners, for example, 1B, attached to stove No. 1. The corresponding branch 13 of the gas main conducts fuel gas to the gas box 69 from which the gas enters the burner 1B by way of the neck 70, thence through the telescopically mounted burner extension spool 71 and gas port 72 into stove No. 1. The air for combustion is supplied by the fan 73 driven by the motor 74, the air entering through grid 74a.

The burner extension spool 71 is brought into contact with the gas port 72 or is retracted therefrom by means of a hand wheel 75 which is connected to the extension spool 71 through the pinion 76 and the rack 77.

A cam switch 78 having the contacts 1BM is mounted on the stationary part of the burner 1B. The cam switch shoe 79 is mounted on the burner extension spool 71 in a position to operate the cam switch 78 when the extension spool 71 is in retracted position.

Stove No. 2 and Stove No. 3 will be provided with gas burners similar to that described in connection with stove No. 1 and will be provided with like associated parts, the cam switch therefore being provided with contacts 2BM and 3BM respectively.

Figure 7 is a view in front elevation of any one of the stove doors, for instance 1SD, attached to stove No. 1. Though doors are shown, said doors are merely illustrative of any preferred means for shutting off communication between the burner and its stove. Figure 7 shows gas port 72 open. That is, the stove door 1SD is shown in a position away from the gas port 72. When the gas port 72 is to be closed the stove door 1SD is moved so that its vertical center line MM is in juxtaposition with the vertical center line M'M' of the gas port 72. To secure tight closure the forked yoke 80 is brought into engagement with the link 81 and swivel bolt 82. The pin 83 is then entered in link 81 and the wing nut 84 is tightened, thus bringing the stove door 1SD into close contact with the gas port 72. The stove door 1SD is suspended by the turnbuckle 85 from the trolley 86 which in turn rides on the trolley beam 87 supported by the brackets 88 fastened to stove No. 1. Attached to the trolley 86 is the cam switch shoe 89 which when the stove door 1SD is centered over the gas port 72 engages and actuates the cam switch 90. Said cam switch 90 is provided with contacts 1SDC1. Stove No. 2 and stove No. 3 will be provided with stove doors similar to the stove door 1SD and provided with like associated parts, the cam switch 90 thereof being provided with the contacts 2SDC1 and 3SDC1 respectively.

Figure 8:
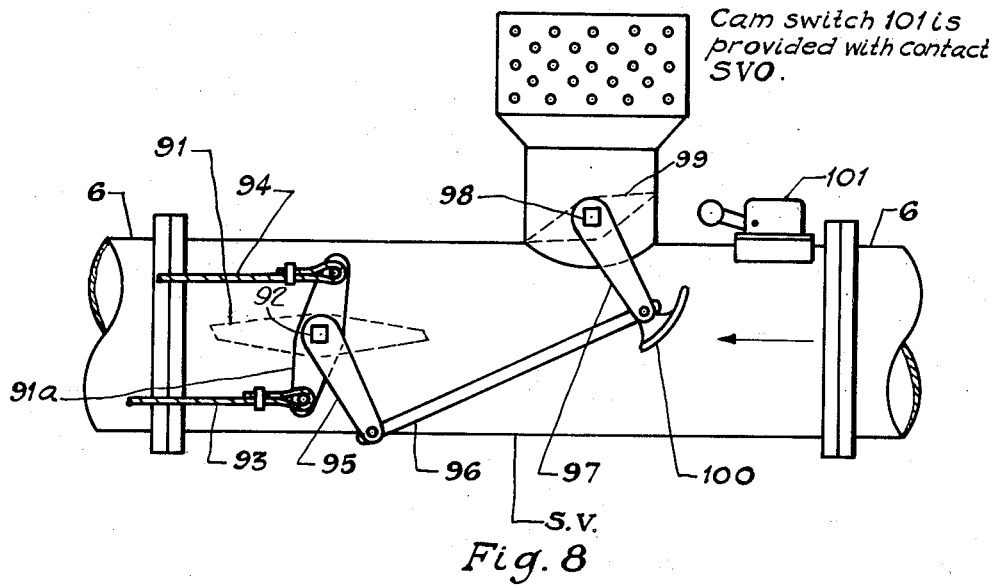
Figure 8 is a view in side elevation of the snort valve and the operating mechanism therefor associated with the cold blast main illustrated in Figure 1.

Figure 8 is a view in side elevation of the snort valve SV together with the operating mechanism therefor. The snort valve is mounted in the cold blast main 6. The solid arrow indicates the direction of flow of the cold blast air. The snort valve SV is provided with the shut-off butterfly 91 which is operated by means of the double arm crank 91a keyed to the shaft 92 which projects exteriorly of the cold blast main 6. Said crank 91a and the butterfly 91 are moved either in clockwise or counterclockwise direction (as the parts are viewed in Fig. 8) by cables 93 or 94 respectively, these cables being drawn by a winch mechanism not shown, usually located in the blast furnace hoist house.

Also keyed to the shaft 92 is the crank arm 95 which is connected by the link 96 to the crank arm 97. The snort valve SV is provided with the relief pipe 98 controlled by the butterfly 99. Said crank arm 97 is connected to said butterfly 99. It will be apparent from Figure 8 that when the butterfly 91 is open (as shown) the air relief butterfly 99 is closed; and vice versa.

Fixed to the crank arm 97 is the cam switch shoe 100 which when butterfly 91 is closed and butterfly 99 is open actuates the cam switch 101 which is provided with contacts SVO.

Figure 9:
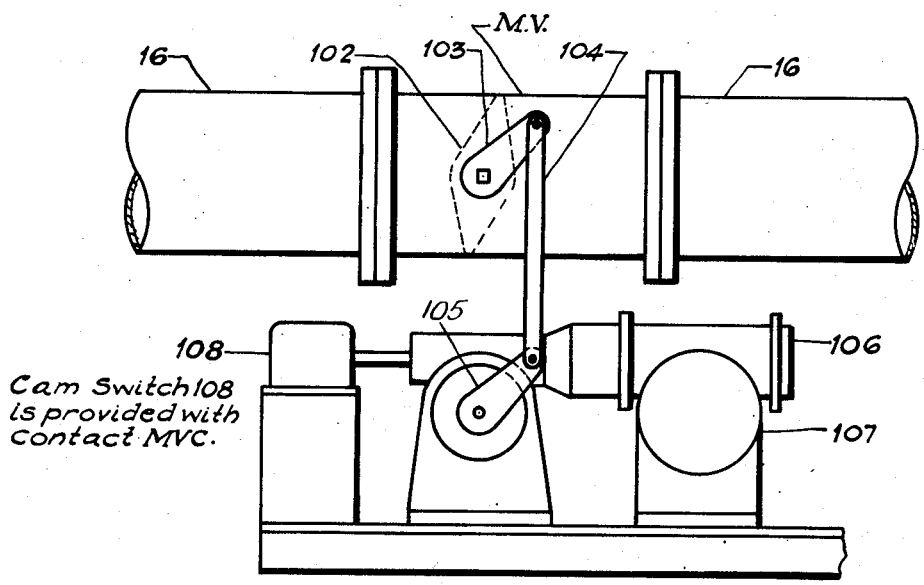
Figure 9 is a view in side elevation of the mixer valve and the operating mechanism therefor associated with the cold blast by-pass main illustrated in Figure 1.

Figure 9 is a view in side elevation of the mixer valve MV together with its operating mechanism. This valve is mounted in position to control the flow of cold blast through the by-pass main 16. Said valve MV includes the butterfly 102 actuated by the crank arm 103 which is connected by link 104 to the crank arm 105. Said crank arm 105 is mounted on the driving end of the speed reducer 106 which is connected at its driven end to the motor 107. An extension of the driving end of the speed reducer 106 gives rotary motion to the multipole cam switch 108 which is provided with the contact MVC.

Figure 10:
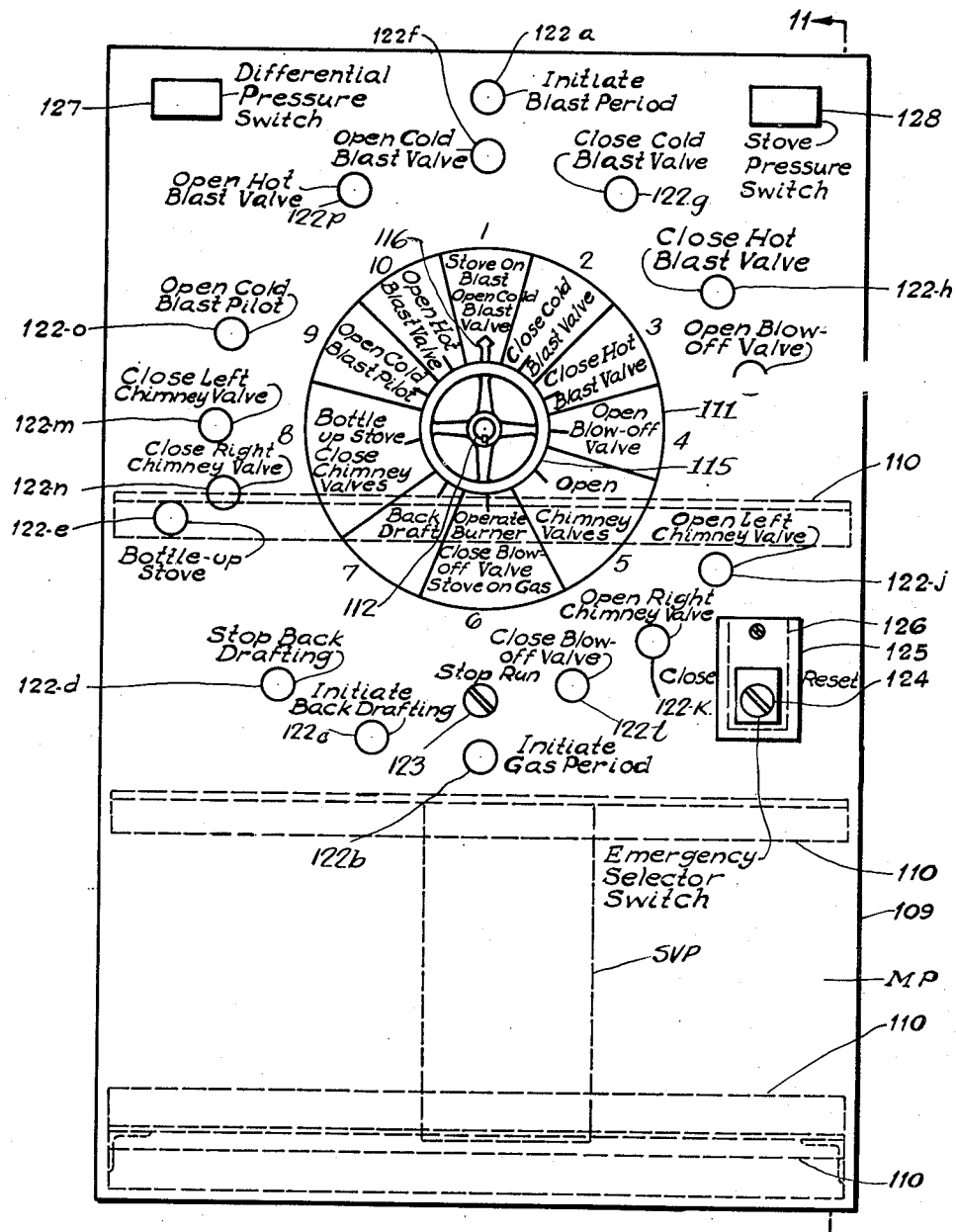
Figure 10 is a view in front elevation of a master panel, one of which is associated with each of the stoves illustrated in Figure 1, and by means of which a sequence of steps may be initiated for operation of the hot blast stoves illustrated in Figure 1.

Figure 10 is a front view of the master panel MP, one of which is associated with each of the stoves Nos. 1, 2 and 3. These panels are not shown in Fig. 1.

Figure 11:
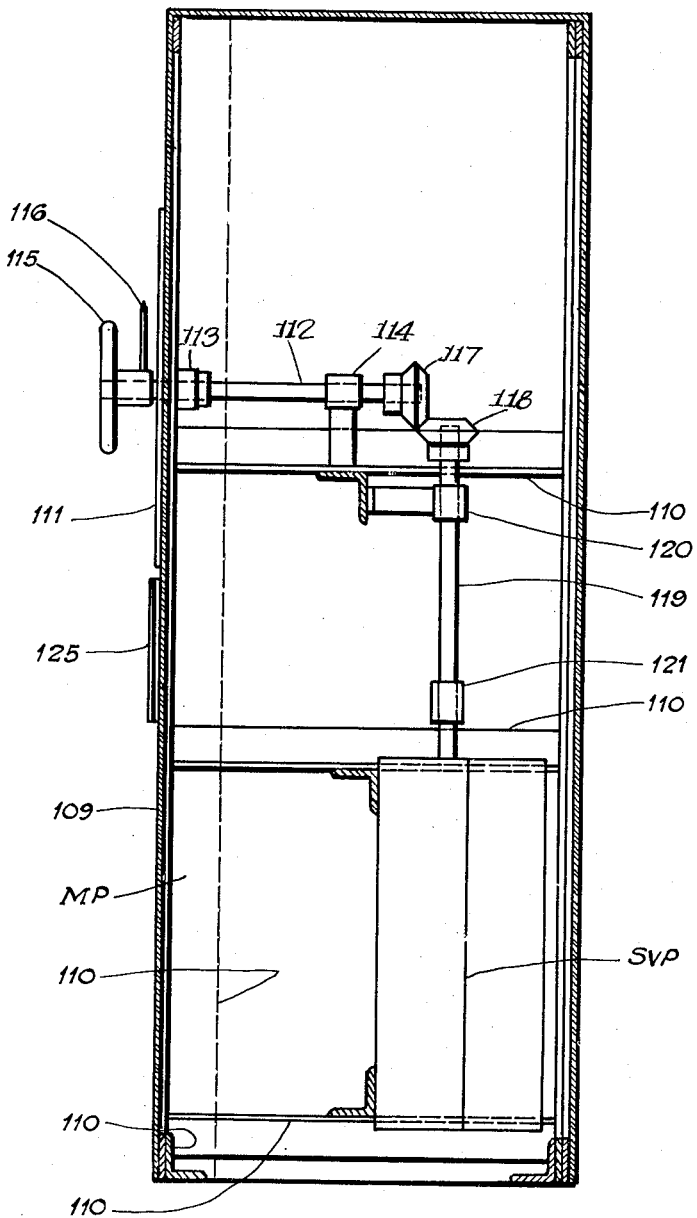
Figure 11 is a sectional view taken along the plane indicated by the arrows 11—11 of Figure 10.

Figure 11 is a section taken on the line 11, 11 of Figure 10. The face board 109 of the panel MP is mounted upon the framing 110. On the face board 109 is the dial 111 divided segmentally.

Figure 10 shows the various segments labeled in accordance with various functions involved in the operation of the valves and accessories for the corresponding stove. The labeling in said segments reads as follows:

1. Stove on blast. Open cold blast valve.
2. Close cold blast valve.
3. Close hot blast valve.
4. Open blow-off valve.
5. Open chimney valves.
6. Operate burner. Close blow-off valve stove on gas.
7. Back draft.
8. Bottle up stove. Close chimney valves.
9. Open cold blast pilot.
10. Open hot blast valve.

Referring to Figs. 10 and 11 a shaft 112 carried by bearings 113, 114 protrudes through the face board 109 at the center of the dial 111 and has keyed to it at its outer end the hand wheel 115 and the pointer 116 which pointer may be positioned over any one of the segments of the dial 111. On the inner end of the shaft 112 is the miter gear 117 which meshes with the miter gear 118 keyed to one end of the shaft 119 carried in bearings 120, 121. The other end of the shaft 119 engages with and operates the multipole stove valve program switch. This multipole stove program switch SVP establishes a relation between the positions of the pointer 116 and the respective poles on the switch SVP. The master panels on stoves Nos. 2 and 3 are similar to the panel above described in connection with stove No. 1 and will be provided with multipole stove valve program switches 2SVP and 3SVP respectively.

A multiplicity of push button switches are mounted in the face board 109 peripherally of the dial 111 and have significant locational and functional relations to the various segments of said dial. Certain of these push buttons are designated as follows and are located in an outer circle adjacent to segments having captions relating to their functions:

122a—Initiate blast period
122b—Initiate gas period
122c—Initiate back-drafting
122d—Stop back-drafting
122e—Bottle up stove Each of these push button switches is provided with a contact or contacts to be referred to more in detail presently.

Other push button switches, disposed in an inner circle, are mounted in the face board 109 adjacent to segments having captions relating to their functions as follows:

122f—Open cold blast valve
122g—Close cold blast valve
122h—Close hot blast valve
122i—Open blow-off valve
122j—Open left chimney valve
122k—Open right chimney valve
122l—Close blow-off valve
122m—Close left chimney valve
122n—Close right chimney valve
122o—Open cold blast pilot
122p—Open hot blast valve All of the push button switches 122a to 122p inclusive are of the type which may be pushed momentarily and allowed to return to initial position.

Though push-button switches have been referred to, it will be understood that any desired switching mechanism may be used, which, for convenience, will be referred to as operational switches.

Selector switch 123, located on the master panel for each stove, is a two-position member controlling the starting and stopping of the corresponding gas burner motor for that stove. Said switch 123 will remain in either of its two positions. Said switch 123 operates certain contacts to be described more in detail presently.

Selector switch 124, located on the master panel for each stove, is a two-position member for controlling the emergency closing of the cold blast valve. This switch is enclosed in switch box 125, having a renewable glass front 126. This switch controls certain contacts to be described more in detail presently.

Differential pressure switch 127, located on the master panel for each stove (Figure 10) is a two-position switch for ensuring that the hot blast valve of the corresponding stove cannot be opened unless the difference in the pressures within the stove and within the hot blast main is down to a predetermined minimum (1 pound per square inch or less, according to present practice). Said switch controls a relay IDP (referring to No. 1 stove), having the operating coil IDPC and the contact IDPI. Associated with No. 2 stove and No. 3 stove are relays having the prefixes 2 and 3 respectively.

Stove pressure switch 128 located on the master panel for each stove (Figure 10) is a two-position switch actuated by pressure within the corresponding stove for ensuring that the pressure within the corresponding stove is approximately atmospheric before the chimney valves of that stove can be opened. The stove pressure switch 128 when closed causes the actuation of a relay ISP (referring to No. 1 stove) having an operating coil ISPC and contacts ISP1, ISP2. Associated with No. 2 and No. 3 stoves are relays having the prefixes 2 and 3 respectively.

The functions of the differential pressure switch 127 and the stove pressure switch 128 will be referred to more in detail under the heading "Description of the function of the electrically controlled circuits," subhead "First procedure—changing stoves."

*Prefatory description of function of the structure illustrated in Figures 1 to 11, inclusive*

*First procedure—changing stoves.*—For purposes of illustration let it be assumed that No. 1 stove, having been on blast (as shown in Figure 1) for some time is exhausted as to its heat content and it is desired to replace it with No. 2 stove which has been on gas long enough to be fully prepared for a blast period. No. 1 stove is then to be placed on gas in order to restore its heat content. For the reasons outlined above it is necessary, first, to take No. 2 stove off gas and put it on blast. Taking No. 2 stove off gas involves shutting down the burner 2B, closing the stove door 2SD and closing the chimney valves 2RCV and 2LCV (not illustrated). These steps must proceed in the order named, otherwise human life is placed in jeopardy and apparatus is liable to damage or destruction. For example, if the chimney valves are closed before the gas burner is shut down or even before the stove door is in position, hot gases will issue outwardly from the burner port, endangering operating personnel in the vicinity and subjecting the equipment to destructive heat. According to the present invention, therefore, the gas burner 2B is first shut down by manually closing the gas inlet valve 2GV, after which the burner blower motor is stopped by turning the selector switch 123 (on the corresponding master panel, Figure 10) to the stop position. The burner extension spool 71 can then be moved away from the stove so as to permit the bringing of the stove door 2SD into the closed position. The latter is then clamped into place by bolts provided for that purpose.

The stove door 2SD (Figure 7) is a vertically hung disc which traverses a trolley I-beam 87. Arranged in connection with the trolley I-beam 87 is a hatchway cam switch 90 which is actuated when the stove door 2SD is moved to a point where it is centered over the gas door of the stove. Only upon actuating this hatchway cam switch can further measures proceed; specifically, only then can the chimney valves 2RCV and 2LCV be closed.

Further measures are initiated by operating the stove valve program switch 2SVP associated with stove No. 2 (Figures 10 and 11). In this operation the handwheel 115 is turned to place the pointer 116 adjacent to the position marked "Stove on blast." The adjacent push button marked "Initiate blast period" is pushed and released. Thereupon the following valve sequences take place, each step of procedure being provisional upon the completion of the next preceding one as hereinafter described.

The chimney valves 2LCV and 2RCV, each actuated by a motor through gear reduction means, close successively. The multipole cam switches 58 associated with these chimney valves as above described have the function of interlocking the chimney valves with the rest of the stove valve control system as will appear more in detail hereinafter under the heading "Description of the function of the electrically controlled circuits," subhead "First procedure—changing stoves."

The chimney valves 2LCV and 2RCV having come to the closed positions and their multipole cam switches 58 having been appropriately actuated thereby, providing the blow-off valve 2BOV is closed, the pilot plate 41 (Figure 3) of the cold blast valve 2CBV will automatically open. This pilot plate 41 is driven by motor 36 which also drives the main cold blast valve gate 31 with which gate the pilot plate 41 is mechanically connected. Energizing of this motor 36 is provisional upon the positions of the cam switches 58 of the chimney valves 2LCV and 2RCV and the position of the cam switch 68 in the blow-off valve 2BOV (Figure 5). Opening of the cold blast pilot plate 41 (Figure 3) permits cold blast air under pressure from the blowing engine 5 (Figure 1) to enter and fill the stove.

If the pilot plate 41 of the cold blast valve 2CBV were opened without first closing the chimney valves and the blow-off valve, not only would the stove not be filled with blast under pressure but blast air in considerable quantity would escape and the flow thereof to the blast furnace would be substantially reduced. Such mispractice can and, in fact, does occasionally occur with manual stove operation but is avoided by the automatic and interlocked sequencing constituting the basis of this invention.

Presently, by reason of the opening of the pilot plate 41 of the cold blast valve 2CBV, pressure in No. 2 stove builds up to approximately the pressure in the cold blast main 6. This fact is registered on the differential pressure switch 127 mounted on the master panel (Figure 10) whereupon the closing of the contacts of this pressure switch causes the energization of the motor 26 (Figure 2) which operates the hot blast valve 2HBV of the No. 2 stove and at once causes this valve to open.

The hot blast valve prevailingly employed on blast furnace stoves is either a gate valve or a mushroom valve; that is, it is a valve of the unbalanced type difficult to open when there is a substantially higher pressure on one side than on the other. Consequently if an effort were made to open the hot blast valve 2HBV before the blast pressures on both sides were brought into substantial equality (in other words, before filling the stove with blast by way of the cold blast valve 2CBV as above described) the operating means would be subject to stresses greatly in excess of normal requirements and therefore quite apt to be in excess of installed capacity. In such cases the operating means are liable to be damaged. In addition, in the case of the gate-type hot blast valve frequently employed, the dragging of the gate along the seat would be accompanied with such frictional resistance as to render the finely machined surfaces of these parts liable to serious damage. Under manual control, such results can occur, particularly if a power unit is provided for operating a hot blast valve; or, if the operation itself is manual, it is normally beyond the power of the human operator to move the valve at all. As a result, valuable time is lost in the fruitless attempt, which time the stove normally requires for its on-gas period in order to ready it for its next on-blast period.

According to the present invention, the hot blast valve motor is not energized to open this valve until the pressure of the stove has been established but is thereupon energized to open said valve promptly.

Geared to the operating mechanism of the hot blast valve 2HBV is a multipole cam switch 28, having a multiplicity of contacts as above described, which has among its functions the interlocking of the hot blast valve with the rest of the stove valve control system. This function will be described more in detail under the paragraph heading "Description of the function of the electrically controlled circuits."

The hot blast valve 2HBV having come to the fully opened position and this multipole cam switch 28 having been appropriately positioned thereby, the cold blast valve motor 36 (Figure 3) is energized so as to bring the cold blast valve 2CBV into the fully opened position, thus completing the arrangement of the valves on No. 2 stove so as to permit the through flow of blast to the blast furnace.

With manual operation of the stove valves, it can and, in fact, does occasionally occur that the full opening of the cold blast valve is overlooked with the result that presently the only flow of blast reaching the furnace is through the small opening provided by the cold blast valve pilot port 42. This not only reduces seriously the volume and pressure of the air reaching the furnace but also causes a backing up of pressure against the blowing engine to a degree which may cause it to come to a stop, thereby bringing about the entire cessation of blast flow to the furnace with the highly undesirable consequences thereto previously described.

The mispractice just referred to is avoided through certain factors of the automatic sequencing and interlocking operations constituting the basis of this invention. These factors are, firstly, the energizing of the cold blast valve 2CBV to open as soon as the hot blast valve 2HBV is open, as above described, and, secondly, the prevention of the closure of the cold blast valve 1CBV on No. 1 stove until the full opening of the cold blast valve 2CBV on No. 2 stove is assured. This assurance is secured by means of the multipole cam switch 39 (Figure 3) geared to the operating mechanism of the cold blast valve 2CBV on No. 2 stove. This cam switch has among its functions the participation in an interlocking circuit of such nature that no open cold blast valve or open hot blast valve on any stove can be closed unless and until the hot blast valve and the cold blast valve on some other stove are also opened. The nature of this interlocking circuit will be described more at length under the heading "Description of electrical control instrumentalities." This interlocking feature is of particular importance. It prevents one of the most common and at the same time most serious mispractices in manual operation of stove valves, namely, inadvertently taking the blast off of the furnace by closing the hot or cold blast valve or valves of a stove which is on blast before another stove is fully in the on-blast arrangement.

The second part of the routine of changing stoves, the putting of exhausted stove (No. 1) on gas will now be described.

The handwheel 115 on the master panel MP (Figure 10) on No. 1 stove is turned so that the pointer thereof is adjacent to the position marked "Stove on gas" and the adjacent push button marked "Initiate gas period" is pushed. Then, provided the hot blast valve and the cold blast valve on another stove (No. 2 stove) are open, a circuit is completed which causes the cold blast valve motor 36 (Figure 3) on No. 1 stove to close this valve 1CBV. Thereupon the multipole cam switch 39 geared to the cold blast valve operating mechanism attains the position which causes the energization of the hot blast valve motor 26 (Figure 2) and causes it to close the hot blast valve 1HBV. The operating mechanism of the hot blast valve cannot otherwise be actuated. This is an improvement over former practice since the manual operating mechanism, commonly a winch and cable arrangement, can be unwound at any time. Specifically, it can be and, in fact, is occasionally so unwound before the cold blast valve is closed. The hot blast valve may not then immediately close, being supported by the continued current of blast, but when presently the cold blast valve is closed, the hot blast blast valve, supported neither by the current of blast nor by its operating mechanism, falls heavily and with damaging impact. This mispractice cannot occur with the automatic and interlocked sequencing constituting the basis of this invention.

As soon as the hot blast valve 1HBV is closed, the multipole cam switch 28 connected to its operating mechanism attains the position which energizes the blow-off valve operating motor 67 (Figure 5) so as to open the blow-off valve 1BOV. The blow-off valve cannot otherwise be opened. With manual operation, on the other hand, the blow-off valve can be opened at any time and if this is done (as in fact it occasionally is according to prior practice) before both the hot blast valve and the cold blast valve are closed, the result is to allow the blast to escape—in effect to take the blast off the furnace with the highly undesirable consequeces heretofore described. This mispractice cannot occur with the automatic and interlocked sequencing constituting the basis of this invention.

Presently the pressure within the stove (stove No. 1 as per the example being discussed) is reduced to a low value by reason of the fact that the blow-off valve 1BOV is open and this condition is registered at the stove pressure switch 128 (Figure 10). The operation of this switch will close a contact to be referred to more in detail presently to cause the motors of the chimney valves 1RCV and 1LCV (not illustrated) to open these valves.

As soon as either of the chimney valves 1LCV or 1RVC is fully opened, the resulting position of the multipole cam switch 58 (Figure 4) results in the completion of a circuit (through contacts to be described more in detail presently) causing the blow-off valve 1BOV to close.

The pressure in stove No. 1 now having been reduced to atmospheric pressure, it is permissible to open the stove door 1SD and to move it to one side so as to permit the burner extension spool 71 to be brought into contact with the gas port flange 72 of the stove. Before the burner blower can be started, both chimney valves 1LCV and 1RVC must be opened and their multipole cam switches must be positioned accordingly. It is also necessary that the blow-off valve 1BOV be closed and that the hot blast valve 1HBV be closed, permitting the starting of the burner motor 74. This interlocking prevents the starting of the burner when the chimney valves are closed, a thing which can be done with manual stove operation and which would result in placing life and equipment in jeopardy by gas or flame issuing backwardly through the burner or by causing the burner air fan to blow air back into the gas main. This mispractice cannot occur with the automatic interlocking sequencing constituting the basis of this invention.

With the opening of the gas valve 1GV after the starting of burner 1B, the stove (stove No. 1 according to the example being discussed) is on gas and a stove change as applied to No. 1 and No. 2 stoves is completed.

*Second procedure—bottling up.*—For purposes of illustration, it is now assumed that No. 3 stove, having been on gas for some time, is fully heated up but that neither stove No. 1 nor stove No. 2 is yet exhausted as to its heat content in heating blast for the blast furnace and that therefore stove No. 3 must await its turn for the on-blast position. In such case a stove such as No. 3 stove is to be bottled up, that is, gas firing is to be discontinued and the stove valves are all to be closed so as to avoid to as great a degree as possible the loss of heat.

The functional description of the procedure of bottling up under this invention is as follows:

Reference may be made to stove No. 3 by way of example, this stove having been operated on gas and having been heated up to the desired point. The burner gas valve 3GV, having been closed, the burner motor 74 having been stopped, the extension spool 71 of burner 3B having been retracted, and the stove door 3SD having been moved to a point where it is centered over the gas port of the stove, the master panel handwheel 115 is turned to the position marked "Bottle-up stove." Then upon pushing the adjacent push button marked "Bottle-up stove," the left and right chimney valves 3LCV and 3RCV will close. This action can take place only provided the stove door 3SD is centered over stove gas port so as to appropriately position the limit switch 90 associated therewith and provided the hot blast valve 3HBV, the cold blast valve 3CBV and the blow-off valve 3BOV of this stove are closed so as to appropriately position the multipole cam switches associated respectively with these valves.

In unbottling a stove, it may be desired to arrange its valves either for on-blast or for on-gas. The handwheel 115 of the master panel MP (Figure 10) of that particular stove is turned so that the pointer thereof is located at the segment marked "Stove-on-blast" or "Stove-on-gas" and the corresponding push button "Initiate blast period" or "Initiate gas period" is pressed. The stove valves will assume the required positions in the sequence and with the provisions described under the sub-heading above "First procedure—changing stoves."

*Third procedure—back-drafting.*—As heretofore described, it is occasionally necessary to employ the natural draft available in a stove and the chimney associated with the stoves in order to remove all residual pressure from the bottom part of the blast furnace. This procedure is known as back-drafting and will be described as follows:

In the following account it will be assumed that No. 1 stove has been on blast and No. 2 and No. 3 stoves have been on gas; and that back-drafting is to be conducted on No. 2 stove.

Obviously, back-drafting is not called for and should not be made possible unless the blast is off the furnace. The snort valve SV (Figure 1) must be opened to the atmosphere and closed against the furnace before any measures for back-drafting can proceed.

Another requirement for safe back-drafting is that no open channel be provided whereby back-draft gas could find its way into the cold blast system. One such channel could be the cold blast mixer main 16 (Figure 1). Consequently, it is required, according to the present invention that the mixer valve MV (Figure 1) be closed before any measures for back-drafting can proceed. Another such channel could be through a stove that is on blast (No. 1 stove according to the example being discussed). Accordingly it is required that both the hot blast valve 1HBV and the cold blast valve 1CBV of the on-blast stove (stove No. 1 according to the example being discussed) be closed. This positioning is secured by turning the handwheel 115 of the master panel (stove No. 1 according to the present example) so that the pointer thereof is positioned at the segment entitled "Bottle-up stove." The hot blast valve 1HBV and the cold blast valve 1CBV of this stove will thereupon assume the closed positions automatically provided the snort valve SV is open and the mixer valve MV is closed. This interlock is accomplished through means to be described more in detail presently.

Another requirement for safe back-drafting is that air be prevented from reaching the stove chimney or the flue system connected thereto. Although it is intended that back-drafted gases be burned in the back-draft stove before they reach the chimney, this cannot always be assured and they may reach the chimney in an unburned condition. If these gases encounter no material amount of air they will proceed up the chimney in a harmless manner. If, on the other hand, they encounter air in material quantity they will ignite with damaging effect. Such a source of air can be an open stove, that is, a stove that has been on gas, and at which the gas burner has been shut off in view of the anticipated stoppage of the blast furnace but at which neither the stove door nor the chimney valves have been closed, thus permitting air to be drawn through the stove into the flue system and chimney. Consequently, it is required, according to the present invention, that all stove doors and all chimney valves (except on the stove that is to be used for back-drafting) be in closed position before further measures for back-drafting can proceed. These parts are normally closed on the stove that has been on blast (stove No. 1 according to the example being discussed) but should they be inadvertently opened the multipole cam switches on the chimney valves on No. 1 stove and the hatchway switch on the stove door will be so positioned as to prevent the completion of electric circuits which would permit back-drafting on any stove. This interlock will be described more in detail presently.

The same requirement applies to No. 3 stove which may have been on gas so that its stove door and its chimney valves have been opened. Hence, before back-drafting can proceed the gas supply valve 3GV must be closed and the motor 74 of the burner 3B stopped. The stove door of No. 3 stove must be centered over its corresponding gas port and the handwheel 115 at the master panel (Figure 10) at No. 3 stove must be turned so that its pointer is positioned at the segment marked "Bottle-up stove." The adjacent push button "Bottle-up stove" will be pushed and released, resulting in the closure of the chimney valves 5LCV and 3RCV of No. 3 stove.

The stoves, except the one scheduled for back-drafting, are now in bottle-up position. This means that their chimney valves, hot blast valves, cold blast valves and stove doors are all in closed positions. The interlocking of the various instrumentalities (to be described more in detail presently) is such that any exception to the above mentioned valve settings prevents further procedure in the direction of back-drafting.

It should be further noted that according to the present invention, interlocking circuits (to be described presently) are provided which prevent using for back-drafting the stove that has been on blast and which require that this same on-blast stove be put back on blast at the conclusion of back-drafting. This is done in order to avoid any chance of the restored stream of air blast encountering residual volumes of back-draft gas. This interlocking will be described under the heading "Description of electrical control instrumentalities."

The act of back-drafting is now accomplished by turning the handwheel 115 at the master panel (of stove No. 2 according to the present example) to the position marked "Back-draft" and by pushing and releasing the adjacent button marked "Initiate back-drafting." Then, provided the burner extension spool 71 at this stove is retracted so as to appropriately position the interlocking switch 78 associated therewith, and provided the stove door 2SD of this stove is not centered over this gas port and provided the chimney valves 2LCV and 2RCV of No. 2 stove are open so as to appropriately position the interlocking cam switches associated therewith; and provided, further, that the requirements concerning the other stoves and concerning the snort valve SV and the mixer valve MV are fulfilled as previously described, the hot blast valve 2HBV on No. 2 stove will automatically open, thus establishing a continuous channel from the tuyères of the furnace to and through the chimney 15, thereby establishing the desired back-draft. The electric control circuits for accomplishing the interlocks just referred to will be described presently.

The reason for requiring that the stove door 2SD of the back-draft stove No. 2 be open is that it is desired to burn the back-draft gases so that they may thenceforth be harmless. The stove is an appropriate place for this combustion to take place and the open gas port gives appropriate entrance for air for this combustion.

In order to discontinue back-drafting, the push button "Stop back-drafting" on the master panel MP of the corresponding stove (stove No. 2 according to the example being discussed) is pushed and released. Then, through interlocking controls to be described presently, the hot blast valve 2HBV on No. 2 stove will close.

In order to prepare for the restoration of blast on the furnace, which requires that No. 1 stove, previously on blast, be now returned on blast, the handwheel 115 on the master panel of No. 1 stove is turned to the position marked "Stove on blast" and the adjacent push button "Initiate blast period" is pushed and released. The hot blast valve 1HBV and the cold blast valve 1CBV on No. 1 stove will then open automatically. Interlocking circuits, to be described presently under the heading "Description of electrical control instrumentalities," prevent bringing any other stove to the on-blast setting except the stove that was on blast prior to back-drafting (stove No. 1 according to the example being discussed).

In order to further explain the improvements effected by this invention, a number of the more common derelictions found to occur with manual stove operation will be cited, each and all of which are prevented by the means covered by this invention, to wit: the mixer valve MV may be left open, thus providing access for the back-draft gases to the cold blast system; the hot blast and cold blast valves 1HBV and 1CBV on the on-blast stove may be left open, thus providing access for back-draft gases to the cold blast system; the stove door 3SD and the chimney valves 3LCV and 3RCV may be left open on No. 3 stove, thus providing access for air in the flue and chimney; the stove door 2SD on the back-draft stove may be closed, thus causing the back-draft gases to proceed unburned (through lack of air) into the flues and chimney; any stove can be used for back-drafting and any stove can be put on blast after back-drafting. These are all recitations of derelictions which may occur according to blast furnace practice as now commonly followed.

The improvement residing in means which prevent these derelictions becomes more apparent when it is noted that under heretofore existing systems of stove operation, the mere act of back-drafting can be consummated regardless of any or all of these derelictions. It is a fact well known to those skilled in the art that back-drafting is frequently so conducted.

*Fourth procedure—emergency blast shut-off.*— It has been pointed out that under normal conditions it is grave mispractice to operate blast furnace stoves in such a way as to inadvertently shut off the flow of blast to the furnace. However, there can arise a situation at a blast furnace which calls for an exception to this stipulation. Provision is made under this invention to accommodate this exception.

For this purpose there is provided a two-position selector switch 124 (Figure 10), to be referred to more in detail presently. As noted above, this selector switch 124 is preferably located under glass or in some other manner which discourages inadvertent manipulation. If this switch 124 is turned to "closed" position, all of the interlocking circuits hereinabove described are cancelled and the motor 36 of the cold blast valve on the stove on blast is actuated at once to close that valve. After the cold blast valve has closed, the hot blast valve of the same stove will automatically close. This interlock will be described more in detail presently.

To put the stove on blast after an emergency closure of this cold blast valve the push button 124 is turned to the "reset" position, the handwheel 115 on the master panel is turned to the "Stove-on-blast" position, and the "Initiate blast period" push button is pushed and released. This action causes the sequence heretofore described under the heading "First procedure—changing stoves" to wit: the opening of the cold blast valve pilot plate 41, the building up of pressure in the stove to cold blast pressure, the resultant opening of the hot blast valve followed by the full opening of the cold blast valve so that the stove is again on blast. This automatic action will be referred to more in detail presently.

*Automatic control of intermediate steps of operation of the instrumentalities disclosed in Figures 1 to 11, inclusive*

The present invention provides automatic mechanism whereby any part of a predetermined program may be followed through with the safeguards above described.

Figure 13A:
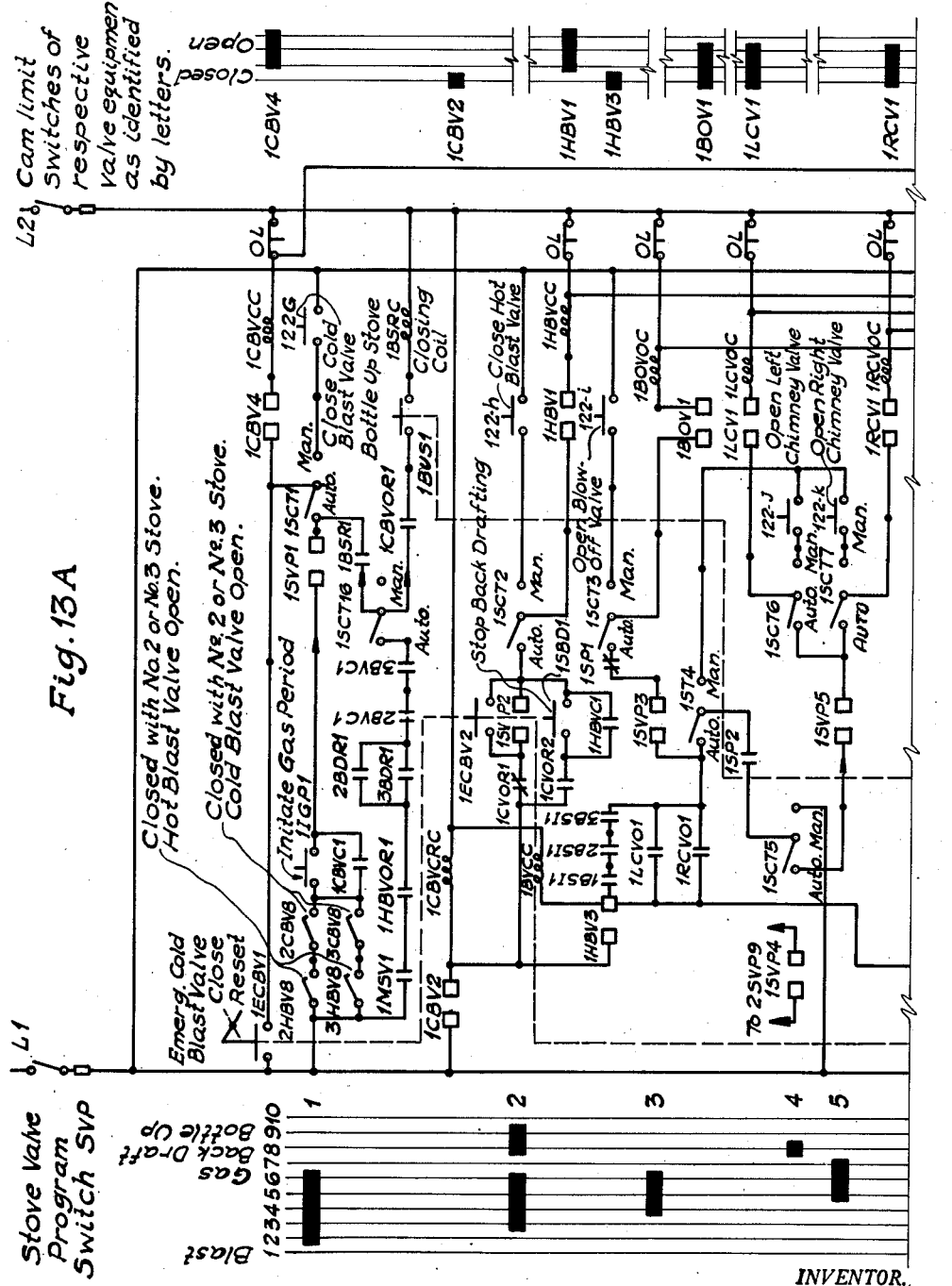
Figures 13A, 13B and 13C are matching parts of a circuit diagram illustrating the electrical connections between the master panel (Figures 10 and 11) and various limit switches or cam switches in the instrumentalities associated with the No. 1 stove as illustrated in Figures 1 to 9 inclusive.
Figure 13B:
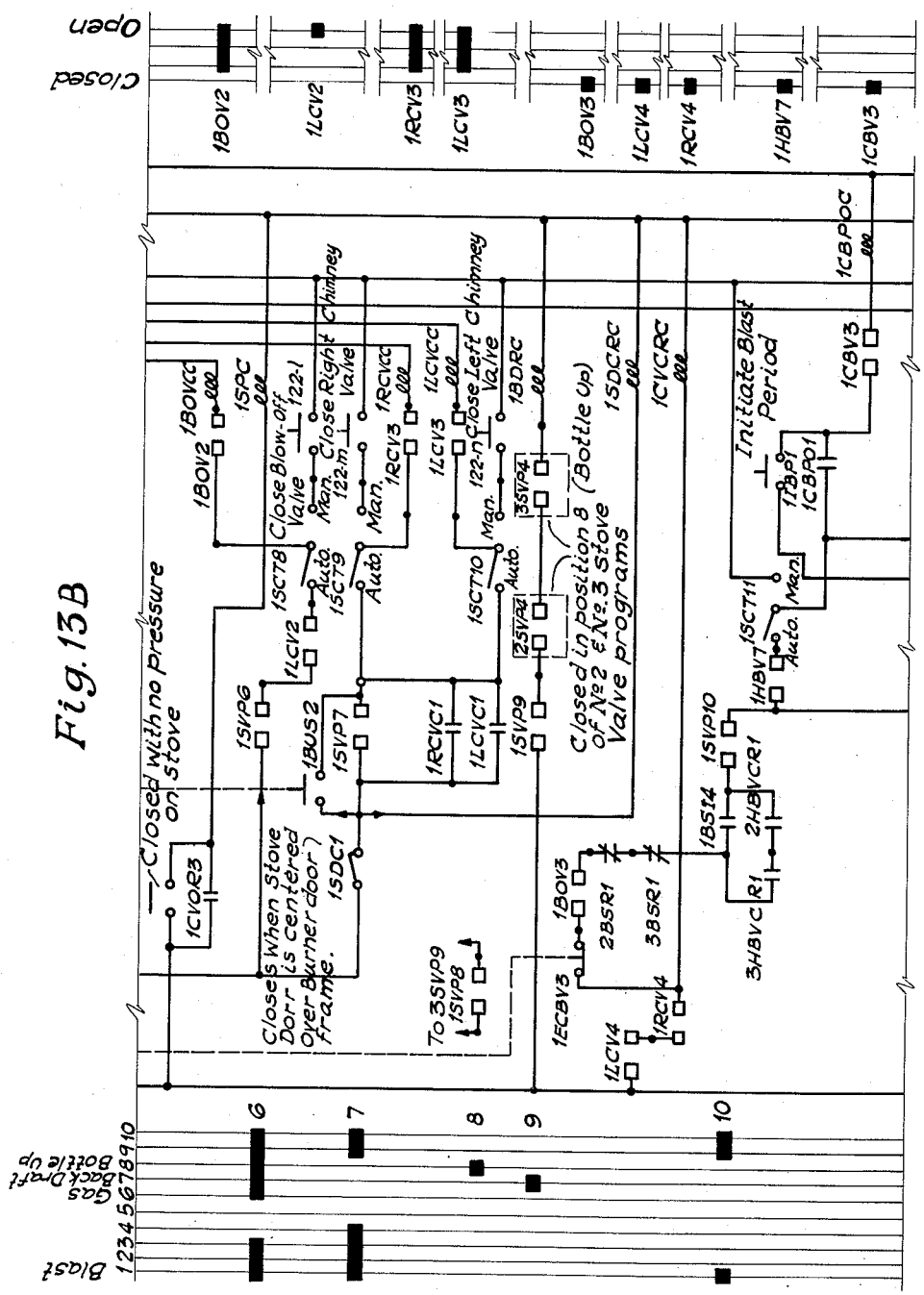
Figure 13C:
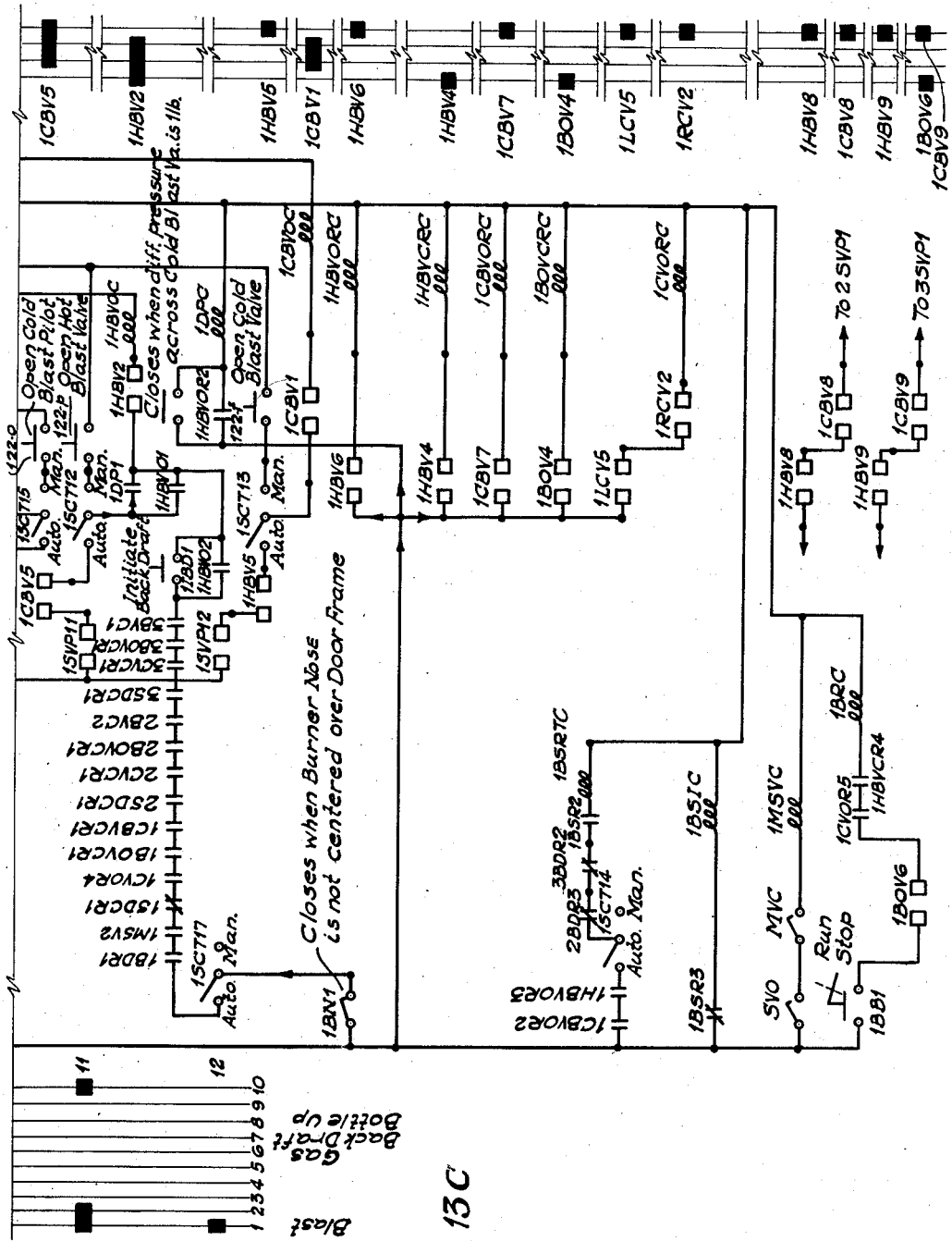

Means are provided on the master panels which include push buttons for operating switches to provide operation of the various pieces of equipment embodied in the installation. The control circuit for these push buttons is left open when the stove control transfer switch SCT is turned to the "Automatic" position. Control transfer switch SCT is a multipole switch, the poles and contacts of which are indicated in Figures 13A, 13B and 13C. One such switch is associated with each of the groups of relays and contactors for each stove.

When this control transfer switch SCT is turned to the "Manual" position, the push button switches can be used for positioning the equipment for repairs or adjustment that will ultimately be necessary after long periods of operation. The following describes briefly the operations that may be attained by using the various push button switches located on each of the master panels (Figure 10) of the three stoves of the illustrated installation.

Pressing the push button 122g marked "Close cold blast valve" will cause the cold blast valve to close. The closing operation will be halted when the cold blast valve reaches its fully closed position by the operation of the multipole cam switch 39 (Figure 3).

Pressing the push button 122h marked "Close hot blast valve" will cause the hot blast valve to close. This closing operation will be halted when the hot blast valve reaches its fully closed position by the operation of the multipole cam switch 28 (Fig. 2).

Pressing the push button 122i marked "Open blow-off valve" will cause the blow-off valve to open. The opening operation will be halted when the blow-off valve reaches its fully open position by the operation of the multipole cam switch 68 (Fig. 5).

Pressing the push button 122j marked "Open left chimney valve" or the push button 122k marked "Open right chimney valve" will cause the corresponding chimney valve to open provided the stove pressure has been reduced to almost zero as shown by the operation of relay SP to be described presently. The opening movement of either chimney valve will be halted when the chimney valve reaches its fully open position by the operation of the multipole cam switch 58 (Fig. 4).

The pressing of the push button 122l marked "Close blow-off valve" will cause the blow-off valve to close. The closing movement of this valve will be stopped by the operation of the multipole cam switch 68 (Fig. 5).

The pressing of the push button 122m marked "Close left chimney valve" or the push button 122n marked "Close right chimney valve" will cause the corresponding chimney valve to close. The closing movement will be halted when the chimney valve has reached its fully closed position by the operation of the multipole switch 58 (Fig. 4).

The opening of the cold blast valve can be accomplished only by first pressing the push button 122o marked "Open cold blast pilot." This will cause the cold blast valve to move a short distance opening pilot port 41 (Figure 3). The motion of the cold blast valve is halted by the operation of the multipole cam switch 39.

The pressing of the push button 122p marked "Open hot blast valve" will cause the hot blast valve to open provided that the differential pressure across the hot blast valve is within a predetermined limit, for example, one pound per square inch as evidenced by the operation of relay DP to be described presently.

The pressing of the push button 122f marked "Open cold blast valve" will cause the cold blast valve to open provided also that the cold blast valve pilot plate 41 (Figure 3) has first been opened. The opening motion of the cold blast valve will be halted when said valve is in its fully open position by the operation of the multipole cam switch 39.

*Description of electrical control instrumentalities*

The disclosed embodiment of the present invention includes three master panels, MP, one for each of the three stoves, and three sets of limit switches, one set for each of the three stoves.

The control equipment associated with each stove consists broadly of (1) the master panel MP containing various push buttons, selector switches, the differential pressure switch, stove pressure switch and the manually operated stove valve program switch, SVP, (2) various limit switches otherwise called cam switches or multipole cam switches, mounted on the various instrumentalities and mechanically operated by such instrumentalities, and (3) three groups of relays and contactors associated with the controls for the motors driving the valves for the respective stoves. The numbers 1 to 10 applied to the lines appearing at the left of 13A, 13B, 13C, 14A, 14B, 14C, 15A, 15B and 15C refer to the ten angular positions of the stove valve program switch SVP, Fig. 10. The similar vertical lines at the right of the figures above mentioned refer to the limit switches associated with the various valves and other devices operated. For instance, in connection with Fig. 13A, contacts 1CBV4 in the topmost line are bridged when the cold blast valve is fully opened or partially opened. These contacts are unbridged when the cold blast valve is fully closed. Furthermore, when the cold blast furnace is fully closed, contacts 1CBV2 in Fig. 13A are bridged. As soon as the cold blast valve is partially opened, these contacts become unbridged. Similarly, contacts 1HBV1 are bridged when the hot blast valve is fully opened or partially opened, and are unbridged when the hot blast valve is fully closed. Contacts 1HBV3 are bridged when the hot blast valve is fully closed.

The following is a brief catalog of various relay coils and contacts and contactors pertaining to No. 1 stove. The relays and contactor coils and contacts for No. 2 stove are identical therewith except that they have the prefix 2. The relays and contactors for No. 3 stove are identical with those referred to in connection with No. 1 stove except that they have the prefix 3.

*Catalog of identifications*

These physical relays and contactors themselves are not shown in the drawings due to the complexity and difficulty of including them therein. However, the coils which operate them, and the contacts operated by them are shown.

The identifications of the figures above referred to are catalogued with the figures in which they appear, as follows:

| Identification | Figure | Identification | Figure |
|---|---|---|---|
| 1CBVC0 | 13A | 1CBVCR0 | 13A |
| 1CBVC1 | 13A | 1CBVCR1 | 13C |
| 1CBVC2 | 12 | 1HBVOR0 | 13C |
| 1CBVC3 | 12 | 1HBVOR1 | 13A |
| 1CBVC4 | 12 | 1HBVOR2 | 13C |
| 1CBVO0 | 13C | 1HBVOR3 | 13C |
| 1CBVO1 | 12 | 1HBVCR0 | 13 |
| 1CBVO2 | 12 | 1HBVCR1 | 14B |
| 1CBVO3 | 12 | 1HBVCR2 | 14B |
| 1BOVCC0 | 13B | 1HBVCR3 | 15B |
| 1BOVC1 | 12 | 1HBVCR4 | 13C |
| 1BOVC2 | 12 | 1BOVCR0 | 13C |
| 1BOVC3 | 12 | 1BOVCR1 | 13C |
| 1BOVO0 | 13A | 1BOVCR2 | 14C |
| 1BOVO1 | 12 | 1BOVCR3 | 15C |
| 1BOVO2 | 12 | 1CVOR0 | 13C |
| 1BOVO3 | 12 | 1CVOR1 | 13A |
| 1HBVC0 | 13A | 1CVOR2 | 13A |
| 1HBVC1 | 13A | 1CVOR3 | 13C |
| 1HBVC2 | 12 | 1CVOR4 | 13C |
| 1HBVC3 | 12 | 1CVOR5 | 13C |
| 1HBVC4 | 12 | 1CVCR0 | 13B |
| 1HBVO0 | 13C | 1CVCR1 | 14C |
| 1HBVO1 | 13C | 1CVCR2 | 15C |
| 1HBVO2 | 13C | 1CBPO0 | 13B |
| 1HBVO3 | 12 | 1CBPO1 | 13B |
| 1HBVO4 | 12 | 1CBPO2 | 12 |
| 1HBVO5 | 12 | 1CBPO3 | 12 |
| 1LCVO0 | 13A | 1CBPO4 | 12 |
| 1LCVO1 | 13A | 1SDCR0 | 13B |
| 1LCVO2 | 12 | 1SDCR1 | 13C |
| 1LCVO3 | 12 | 1SDCR2 | 14C |
| 1LCVO4 | 12 | 1SDCR3 | 15C |
| 1LCVC0 | 13B | 1BVC0 | 13A |
| 1LCVC1 | 13B | 1BVC1 | 14A |
| 1LCVC2 | 12 | 1BVC2 | 14C |
| 1LCVC3 | 12 | 1BVC3 | 15A |
| 1LCVC4 | 12 | 1BVC4 | 15C |
| 1RCVO0 | 13A | 1BSR0 | 13A |
| 1RCVO1 | 13A | 1BSRT0 | 13C |
| 1RCVO2 | 12 | 1BSR1 | 13A |
| 1RCVO3 | 12 | 1BSR2 | 13C |
| 1RCVO4 | 12 | 1BSR3 | 13C |
| 1RCVC0 | 13B | 1BSR4 | 14B |
| 1RCVC1 | 13B | 1BSR5 | 15B |
| 1RCVC2 | 12 | 1BDR0 | 13B |
| 1RCVC3 | 12 | 1BDR1 | 13C |
| 1RCVC4 | 12 | 1BDR2 | 14A |
| 1CBVOR0 | 13C | 1BDR3 | 14C |
| 1CBVOR1 | 13A | 1BDR4 | 15A |
| 1CBVOR2 | 13C | 1BDR5 | 15C |

| Identification | Figure | Identification | Figure |
|---|---|---|---|
| 1BSI0 | 13C | 1HBV3 | 13A |
| 1BSI1 | 13A | 1BSI1 | 13A |
| 1BSI2 | 14A | 2BSI1 | 13A |
| 1BSI3 | 15A | 3BSI1 | 13A |
| 1BSI4 | 13B | 1SVP3 | 13A |
| 1SPC | 13B | 1SP1 | 13A |
| 1SP2 | 13A | 1SCT3 | 13A |
| 1DPC | 13C1 | 1BOV1 | 13A |
| 1DP1 | 13C1 | 1BOVOC | 13A |
| 1MSVC | 13C | 1SCT5 | 13A |
| 1MSV1 | 13A | 1SVP5 | 13A |
| 1MSV2 | 13C | 1LCV1 | 13A |
| 1BC | 12 | 1RCV1 | 13A |
| 1B2 | 12 | 1LCVOC | 13A |
| 1B3 | 12 | 1RCVOC | 13A |
| 1HBV1 | 13A1 | 1LCVO2 | 12 |
| 1HVV2 | 13C | 1LCVO3 | 12 |
| 1HBV3 | 13A | 1LCVO4 | 12 |
| 1HBV4 | 13C | 1RCVO2 | 12 |
| 1HBV5 | 13C | 1RCVO3 | 12 |
| 1HBV6 | 13C | 1RCVO4 | 12 |
| 1HBV7 | 13C | 1LCV1 | 13A |
| 1HBV8 | 13C | 1RCV1 | 13A |
| 1HBV9 | 13C | 1BOVCC | 13B |
| 1CBV1 | 13A | 1BOV2 | 13B |
| 1CBV2 | 13A | 1BOV6 | 13C |
| 1CBV3 | 13B | 1CVOR5 | 13C |
| 1CBV4 | 13A | 1HBVCR4 | 13C |
| 1CBV5 | 13C | 1BRC | 13C |
| 1CBV7 | 13C | 1BUS2 | 13B |
| 1CBV8 | 13C | 1SCT9 | 13B |
| 1CBV9 | 13C | 1SCT10 | 13B |
| 1BOV1 | 13A | 1RCVCC | 13B |
| 1BOV2 | 13B | 1LCVCC | 13B |
| 1BOV3 | 13B | 3BUS2 | 15B |
| 1BOV4 | 13C | 3RCVCC | 15B |
| 1BOV6 | 13C | 3LCVCC | 15B |
| 1RCV1 | 13A | 3RCVCC | 15B |
| 1RCV2 | 13C | 3LCVCC | 15B |
| 1RCV3 | 13B | 3RCV3 | 15B |
| 1RCV4 | 13B | 3LCV3 | 15B |
| SVO | 14C | 3SDC1 | 15B |
| MVC | 13C | 3SDCRC | 15B |
| 1SDC1 | 13B | 1HBVOR1 | 13A |
| 1BN | 13C | 2BDR1 | 13A |
| 1IPB1 | 13B | 2BVC1 | 13A |
| 1GP1 | 13A | 1CBVOR1 | 13A |
| 1IBD1 | 13C | 1BSRC | 13A |
| 1SBD1 | 13A | 3BVC1 | 13A |
| 1BUS1 | 13A | 1BSRT | 13C |
| 1BUS2 | 13B | 1BSR1 | 13A |
| 1BB1 | 13C | 1CBVCC | 13A |
| 2BB1 | 14C | 1CVOR1 | 13A |
| 3BB1 | 15C | 1SVP2 | 13A |
| 1ECBV1 | 13A | 1HBVCC | 13A |
| 1ECBV2 | 13A | 2BDR3 | 14C |
| 1ECBV3 | 13B | 2MSV2 | 14C |
| 2SCT9 | 14B | 2SDCR2 | 14C |
| 2RCV3 | 14B | 2CVOR3 | 14C |
| 2RCVCC | 14B | 2BOVCR2 | 14C |
| 2SVP7 | 14B | 2CBVCR1 | 14C |
| 2SCT10 | 14B | 1SDCR2 | 14C |
| 2LCV3 | 14B | 1CVCR1 | 14C |
| 2LCVCC | 14B | 1BOVCR2 | 14C |
| 2LCV4 | 14B | 1BVC2 | 14C |
| 2RCV4 | 14B | 3SDCR2 | 14C |
| 2ECBV3 | 14B | 3CVCR2 | 14C |
| 2BOV3 | 14B | 3BOVCR2 | 14C |
| 3BSR2 | 14B | 3BVC2 | 14C |
| 1BSR4 | 14B | 2IBD1 | 14C |
| 2BSI4 | 14B | 2HBVOC | 14C |
| 2SVP10 | 14B | 2HBVO2 | 14C |
| 2HBV7 | 14B | 2HBVOC | 14C |
| 2SCT11 | 14B | 2CVOR2 | 14C |
| 2SCT15 | 14C | 2SBD1 | 14A |
| 2IBP1 | 14B | 2HBVCC | 14A |
| 2CBPO6 | 14B | 1SVP4 | 13B |
| 2CBV3 | 14B | 1ECBV3 | 13B |
| 2CBV5 | 14C | 2BSR1 | 13B |
| 2SCT12 | 14C | 3BSR2 | 13B |
| 2DP1 | 14C | 3HBVCR1 | 13B |
| 2HBV2 | 14C | 2HBVCR1 | 13B |
| 2HBVOC | 14C | 1SVP10 | 13B |
| 2HBV2 | 14C | 1HBV7 | 13B |
| 2CBVOC | 14C | 1SCT11 | 13B |
| 2ECBV1 | 14A | 1IBP1 | 13B |
| 2CBV4 | 14A | 1CBPOC | 13B |
| 2CBVCC | 14A | 1DP1 | 13C |
| 2CBV2 | 14A | 1CBVOR2 | 13C |
| 2CVOR1 | 14A | 1HBVOR3 | 13C |
| 2ECBV2 | 14A | 1SCT14 | 13C |
| 2SCT2 | 14A | 2BDR3 | 13C |
| 2HBV1 | 14A | 3BDR2 | 13C |
| 2HBVCC | 14A | 1BSR2 | 13C |
| 2HBV8 | 14A | 1BSRT | 13C |
| 2CBV8 | 13A | 1ECBV1 | 13A |
| 116P1 | 13A | 1CBV4 | 13A |
| 1SVP1 | 13A | 1CBVCC | 13A |
| 1SCT1 | 13A | 1CBV4 | 13A |
| 1CBV4 | 13A |  |  |
| 1CBVCC | 13A |  |  |
| 1CBV2 | 13A |  |  |
| 1CVOR1 | 13A |  |  |
| 1SVP2 | 13A |  |  |
| 1SCT2 | 13A |  |  |
| 1HBV1 | 13A |  |  |
| 1HBVCC | 13A |  |  |
| 1CBV2 | 13A |  |  |

Contactor 1CBVC (a controlling relay or contactor) (No. 1 stove cold blast valve close) has the function of closing circuit to the operating motor for the cold blast valve to cause said motor to close said valve. Said contactor 1CBVC is provided with the operating coil 1CBVCC and with contacts 1CBVC1, 1CBVC2, 1CBVC3, 1CBVC4.

Contactor 1CBVO (a controlling relay or contactor) (No. 1 stove cold blast valve open) has the function of closing circuit to the operating motor for the cold blast valve to open said valve. This contactor 1CBVO is provided with the operating coil 1CBVOC and the contacts 1CBVO1, 1CBVO2, 1CBVO3.

Contactor 1BOVC (a controlling relay or contactor) (No. 1 stove blow-off valve close) has the function of closing circuit to the operating motor of the blow-off valve to close said blow-off valve. Said contactor 1BOVC is provided with the operating coil 1BOVCC and the contacts 1BOVC1, 1BOVC2, 1BOVC3.

Contactor 1BOVO (a controlling relay or contactor) (No. 1 stove blow-off valve open) has the function of closing circuit to operating motor for the blow-off valve to open said valve. Said contactor 1BOVO is provided with the operating coil 1BOVOC and the contacts 1BOVO1, 1BOVO2, 1BOVO3.

Contactor 1HBVC (a controlling relay or contactor) (No. 1 stove hot blast valve close) has the function of closing circuit to the operating motor for the hot blast valve to close said hot blast valve. Said contactor 1HBVC is provided with the operating coil 1HBVCC and the contacts 1HBVC1, 1HBVC2, 1HBVC3, 1HBVC4.

Contactor 1HBVO (a controlling relay or contactor) (No. 1 stove hot blast valve open) has the function of closing circuit to the operating motor for the hot blast valve to open said hot blast valve. Said contactor 1HBVO is provided with the operating coil 1HBVOC and with the contacts 1HBVO1, 1HBVO2, 1HBVO3, 1HBVO4, 1HBVO5.

Contactor 1LCVO (a controlling relay or contactor) (No. 1 stove left chimney valve open) has the function of closing circuit to the operating motor for the left chimney valve to open said left chimney valve. Said contactor 1LCVO is provided with the operating coil 1LCVOC and with the contacts 1LCVO1, 1LCVO2, 1LCVO3, 1LCVO4.

Contactor 1LCVC (a controlling relay or contactor) (No. 1 stove right chimney valve close) has the function of closing circuit to the operating motor for the right chimney valve to close said right chimney valve. Said contactor 1LCVC is provided with the operating coil 1LCVCC and the contacts 1LCVC1, 1LCVC2, 1RCVC3, 1LCVC4.

Contactor 1RCVO (a controlling relay or contactor) (No. 1 stove right chimney valve open) has the function of closing circuit to the operating motor for the right chimney valve to open said right chimney valve. Said contactor 1RCVO is provided with the operating coil 1RCVOC and with the contacts 1RCVO1, 1RCVO2, 1RCVO3, 1RCVO4.

Contactor 1RCVC (a controlling relay or contactor) (No. 1 stove right chimney valve close) has the function of closing circuit to the operating motor for the right chimney valve to close said right chimney valve. Said contactor 1RCVC is provided with the operating coil 1RCVCC and the contacts 1RCVC1, 1RCVC2, 1RCVC3, 1RCVC4.

Relay 1CBVOR (an interlocking relay) (No. 1 stove cold blast valve open relay) responds when the cold blast valve is in open position. Said relay 1CBVOR is provided with the operating coil 1CBVORC and with contacts 1CBVOR1, 1CBVOR2.

Relay 1CBVCR (an interlocking relay) (No. 1 stove cold blast valve closed relay) responds when the cold blast valve is in closed position. Said relay 1CBVCR is provided with the operating coil 1CBVCRC and with the contacts 1CBVCR1.

Relay 1HBVOR (an interlocking relay) (No. 1 stove hot blast valve open relay) responds to the open position of the hot blast valve. Said relay 1HBVOR is provided with the operating coil 1HBVORC and with the contacts 1HBVOR1, 1HBVOR2, 1HBVOR3.

Relay 1HBVCR (an interlocking relay) (No. 1 stove hot blast valve closed relay) responds to the closed position of the hot blast valve. Said relay 1HBVCR is provided with the operating coil 1HBVCRC and with the contacts 1HBVCR1, 1HBVCR2, 1HBVCR3, 1HBVCR4.

Relay 1BOVCR (an interlocking relay) (No. 1 stove blow-off valve closed relay) responds to the closed position of the blow-off valve. This relay 1BOVCR is provided with the operating coil 1BOVCRC and with the contacts 1BOVCR1, 1BOVCR2, 1BOVCR3.

Relay 1CVOR (an interlocking relay) (No. 1 stove chimney valve open relay) responds when both chimney valves are open. This relay 1CVOR is provided with the operating coil 1CVORC and with the contacts 1CVOR1, 1CVOR2, 1CVOR3, 1CVOR4, 1CVOR5.

Relay 1CVCR (an interlocking relay) (No. 1 stove chimney valve closed relay) responds when both chimney valves are closed. This relay 1CVCR is provided with the operating coil 1CVCRC and with the contacts 1CVCR1, 1CVCR2.

Figure 12:
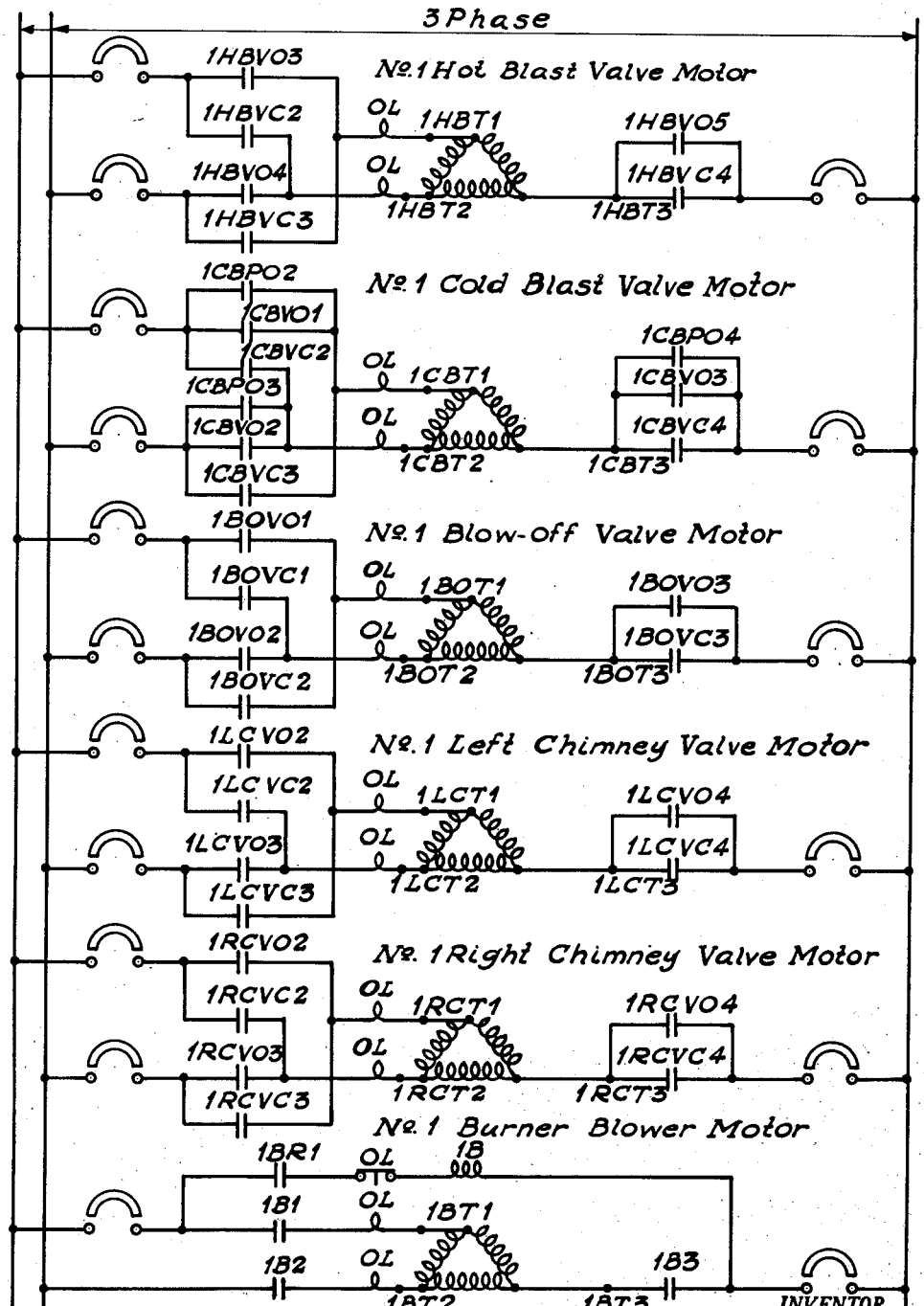
Figure 12 is a motor circuit diagram illustrating the controls for the motors and associated parts in connection with one of the three stoves illustrated in Figure 1, the reference characters referring to the first of the three stoves, that is, the one adjacent to the blast furnace in Figure 1, this diagram, however, being typical of the motor circuits for each of the three stoves.

Contactor 1CBPO (a controlling relay or contactor) (No. 1 stove cold blast pilot open) has the function of closing circuit to the motor for the pilot plate of the cold blast valve. This contactor 1CBPO is provided with the operating coil 1CBPOC and with the contacts 1CBPO1, 1CBPO2, 1CBPO3, 1CBPO4, some of which are in motor circuits (Fig. 12).

Relay 1SDCR (an interlocking relay) (No. 1 stove door closed relay) is responsive to the closed position of the stove door. This relay 1SDCR is provided with the operating coil 1SDCRC and with the contacts 1SDCR1, 1SDCR2, 1SDCR3.

Relay 1BVC (an interlocking relay) (No. 1 stove blast valves closed) responds when both the cold blast valve and the hot blast valve are in closed position. This relay 1BVC is provided with the operating coil 1BVCC and the contacts 1BVC1, 1BVC2, 1BVC3, 1BVC4.

Relay 1BSR (an interlocking relay) (No. 1 stove blast stove relay) interlocks the control so that this stove, scheduled for blast after backdrafting, is returned to blast. This relay 1BSR is a latching type relay, having the closing coil 1BSRC and a trip coil 1BSRTC. When closed by energization of the closing coil it will remain closed until the trip coil is energized. This relay 1BSR is provided with the contacts 1BSR1, 1BSR2, 1BSR3, 1BSR4, 1BSR5.

Relay 1BDR (an interlocking relay) (No. 1 stove back draft relay) interlocks the stove to be used for back drafting. This relay 1BDR is provided with the operating coil 1BDRC and with the contacts 1BDR1, 1BDR2, 1BDR3, 1BDR4, 1BDR5.

Relay 1BSI (an interlocking relay) (No. 1 stove blast stove interlock) further interlocks the control so that the stove that was on blast previous to back draft must be returned to the blast position after back draft is completed. This relay 1BSI is provided with the operating coil 1BSIC and with the contacts 1BSI1, 1BSI2, 1BSI3, 1BSI4.

Relay 1SP (an amplifying relay) (No. 1 stove pressure) interlocks the control making it necessary for the stove pressure to be approximately at atmosphere before opening the chimney valves. This relay 1SP responds to the pressure within the stove. Said relay is provided with the operating coil 1SPC and with the contacts 1SP1, 1SP2.

Relay 1DP (an interlocking relay) (No. 1 stove differential pressure) interlocks the control so that the differential pressure across the hot blast valve is at a predetermined low value before the hot blast valve can be opened. This value should preferably be in the neighborhood of one pound per square inch or less. This relay 1DP is provided with the operating coil 1DPC and with the contacts 1DP1.

Relay 1MSV (an interlocking relay) (No. 1 stove mixer-snort valve) responds when the mixer valve is in closed position and the snort valve is open to atmosphere and closed to the furnace. This relay 1MSV is provided with the operating coil 1MSVC and with the contacts 1MSV1, 1MSV2.

Contactor 1B (a controlling relay or contactor) (No. 1 stove burner) controls the motor for driving the fan on the stove burner blower. This contactor is provided with the operating coil 1BC and with the contacts 1B1, 1B2, 1B3, in the burner motor circuit.

The following is a catalogue of the limit switches associated with No. 1 stove. The prefix 2 is used for No. 2 stove limit switches and prefix 3 for No. 3 stove limit switches. The limit switches for No. 2 stove and No. 3 stove are similar to those for No. 1 stove.

The multipole cam switch 28 (Figure 2) is provided with a multiplicity of contacts as follows:

1HBV1 (No. 1 stove hot blast valve 1) is a contact closed when the hot blast valve is open and open when the hot blast valve is completely closed.

1HBV 2 (No. 1 stove hot blast valve 2) is a contact closed when the hot blast valve is closed and open when the hot blast valve is wide open.

1HBV3 (No. 1 stove hot blast valve 3) is a contact closed only when the hot blast valve is completely closed.

1HBV4 (No. 1 stove hot blast valve 4) is a contact closed only when the hot blast valve is completely closed.

1HBV 5 (No. 1 stove hot blast valve 5) is a contact closed only when the hot blast valve is wide open.

1HBV 6 (No. 1 stove hot blast valve 6) is a contact closed only when the hot blast valve is wide open.

1HBV7 (No. 1 stove hot blast valve 7) is a contact closed only when the hot blast valve is completely closed.

1HBV8 (No. 1 stove hot blast valve 8) is a contact closed only when the hot blast valve is wide open.

1HBV9 (No. 1 stove hot blast valve 9) is a contact closed only when the hot blast valve is wide open.

The cold blast valve CBV (Fig. 3) is provided with a multipole cam switch 39 having a multiplicity of contacts as follows:

ICBV1 (No. 1 stove cold blast valve 1) is a contact closed only when the cold blast valve pilot plate is open.

ICBV2 (No. 1 stove cold blast valve 2) is a contact closed only when the cold blast valve pilot plate is completely closed.

ICBV3 (No. 1 stove cold blast valve 3) is a contact closed only when the cold blast valve pilot plate is completely closed.

ICBV4 (No. 1 stove cold blast valve 4) is a contact closed when the cold blast valve is open and open when the cold blast valve is closed.

ICBV5 (No. 1 stove cold blast valve 5) is a contact closed when the cold blast valve is opened and open only when the cold blast valve is completely closed.

ICBV7 (No. 1 stove cold blast valve 7) is a contact closed when the cold blast valve is wide open.

ICBV8 (No. 1 stove cold blast valve 8) is a contact closed when the cold blast valve is wide open.

ICBV9 (No. 1 stove cold blast valve 9) is a contact closed only when the cold blast valve is wide open.

The blow-off valve IBOV (Figure 5) is provided with the multipole cam switch 68 having a multiplicity of contacts as follows:

IBOV1 (No. 1 stove blow-off valve 1) is a contact closed when the blow-off valve is closed and open only when the blow-off valve is wide open.

IBOV2 (No. 1 stove blow-off valve 2) is a contact closed when the blow-off valve is open and open only when the blow-off valve is completely closed.

IBOV3 (No. 1 stove blow-off valve 3) is a contact closed only when the blow-off valve is closed.

IBOV4 (No. 1 stove blow-off valve 4) is a contact closed only when the blow-off valve is closed.

IBOV6 (No. 1 stove blow-off valve 6) is a contact closed only when the blow-off valve is closed.

The right chimney valve IRCV (Figure 4) is provided with the multipole cam switch 58 having a multiplicity of contacts as follows:

IRCV1 (No. 1 stove right chimney valve 1) is a contact closed when the right chimney valve is closed and open only when the right chimney valve is wide open.

IRCV2 (No. 1 stove right chimney valve 2) is a contact closed only when the right chimney valve is wide open.

IRCV3 (No. 1 stove right chimney valve 3) is a contact closed when the right chimney valve is open and open only when the right chimney valve is completely closed.

IRCV4 (No. 1 stove right chimney valve 4) is a contact closed only when the right chimney valve is completely closed.

The left chimney valve multipole cam switch ILCV is provided with contacts identical with the contacts of the right chimney valve multipole cam switch except that they have the prefix L instead of R.

The snort valve SV (Figures 1 and 8) is provided with the cam switch 101 having the contact SVO (snort valve open) which contact is closed when the snort valve is open to atmosphere and closed to the furnace.

The mixer valve MV (Figures 1 and 9) is provided with the cam switch 108 having the contact MVC (mixer valve closed) closed when the mixer valve is closed.

The stove door SD (Figure 7) is provided with the limit switch 90 having the contact ISDC1, closed when the stove door is centered over the burner port.

The burner IB (Figures 1 and 6) is provided with the limit switch 78 having the contact IBN1 which is closed when the burner nose is in retracted position.

Referring now to the electrical instrumentalities of the master panel MP associated with each of the stoves, push button switch 122a has the function of initiating the blast period and is provided with the contact IIBP1 (biased to open position). Push button switch 122b has the function of initiating the gas period and is provided with the contact LIGP1 (biased to open position). Push button switch 122c has the function of initiating back-draft and is provided with the contact IIBD1 (biased to open position). Push button switch 122d has the function of stopping back-drafting and is provided with the contact ISBD1 (biased to open position). Push button switch 122e has the function of bottling up the stove and is provided with the contacts IBUS1 and IBUS2 (both biased to open position).

Selector switch 123 is a two-position switch for controlling the burner blower and has the two positions "Stop" and "Run." Said selector switch 123 for No. 1 stove is provided with the contact IBB1, closed when said switch is in "Run" position and open when said switch is in "Stop" position. Stove No. 2 and stove No. 3 have corresponding contacts 2BB1 and 3BB1.

Selector switch 124 is a two-position switch and has the function of controlling the emergency closure of the cold blast valve. Said selector switch 124 may be moved to the position marked "Reset" or "Close" and, on the panel associated with No. 1 stove, is provided with the contacts IECBV1, IECBV2 and IECBV3.

The push button switches 122f to 122p, inclusive, are all provided with contacts which control the manual operation of the instrumentalities disclosed in Figures 1 to 9, inclusive, when it is desired to operate the stove installation manually. For manual operation the stove control transfer switch SCT associated with the particular stove being controlled should be turned to the position marked "Man." after which the particular button 122f to 122p would be pushed for the operation associated with that particular button.

Means are provided for manual, that is, non-interlocking operation, if desired. For this purpose an 18 pole, 2 position control transfer switch SCT is provided, some of the blades of which are indicated in Figure 13A. Said blades may be located in the position marked "Man." or the position marked "Auto." When said blades are in the position marked "Auto" (the normal position) the automatic sequences are obtained. When said blades are in the position marked "Man." the manual or non-interlocking features of this control are obtained.

*Description of the function of the electrically controlled circuits*

In describing the functions of the electrically controlled circuits involving the control of No. 1 stove, it is necessary to discuss certain electrical circuits associated with stoves Nos. 2 and 3. In the discussion which follows just as in the discussion hereinabove, the prefix 1 on relays, contactors, conductors and other associated pieces of equipment denotes equipment that is associated with No. 1 stove. The prefix 2 applies to such parts associated with No. 2 stove and the prefix 3 applies to similar parts associated with No. 3 stove.

*First procedure—changing stoves:*—The discussion of the control sequence may be started with the assumption that No. 1 stove is on blast and that No. 2 and No. 3 stoves are on gas. No. 2 stove is to go on blast to replace No. 1 stove.

The No. 2 stove has been on gas. Therefore it is necessary to shut off the gas supply, shut off the burner blower and close the gas port of the stove.

The pointer 116 of the master panel MP of No. 2 stove is now moved to position 1 (stove on blast). Contact 2SVP7 (Figure 14B) closes in this No. 1 position and an electrical circuit is completed from conductor L1 through multipole cam switch contacts 2CBV2 and 2HBV3 (Fig. 14A) thence through the limit switch contacts 2SDC1 (Figure 14B) through contact 2SVP7 through the stove control transfer switch contact 2SCT9 (located in "Auto." position) thence through multipole cam switch contacts 2RCV3 to the contactor coil 2RCVCC to the conductor L2.

Another path that parallels the path just traced after it leaves the contact 2SVP7 goes through the pole 2SCT10 on the transfer switch ("Auto." position) through the multipole cam switch contacts 2LCV3 to the contactor coil 2LCVCC to the conductor L2. This causes the chimney valve motors 54 (Figure 4) to operate, thereby closing the left and right chimney valves of No. 2 stove. With the closure of these two chimney valves and the consequent movement of the respective multipole cam switches to closed position, a circuit may be traced from the conductor L1 Fig. 14B through the multipole cam switch contacts 2LCV4, 2RCV4; through the contacts 2ECBV3 of the emergency cold blast valve selector switch 124 through the limit switch contacts 2BOV3 through the contacts 3BSR2 and 1BSR4 (both biased to closed position) thence through the contacts 2BSI4; thence through the stove valve program contact 2SVP10, thence through the contact 2HBV7; through the contact 2SCT11 ("Auto." position), thence through the contact 2SCT15 ("Auto." position), (Figure 14C) to the contacts 2IBP1 (Figure 14B) of the push button switch 122a (Initiate blast period). The pressing of this push button 122a will complete the circuit just traced through the operating coil 2CBPOC, the contacts 2CBV3 being bridged, thence to the conductor L2.

Energization of the operating coil 2CBPOC causes the cold blast valve to open part way, that is, to the position where the multipole cam switch contact 2CBV3 is opened. The pilot plate 41 of the cold blast valve CBV (Figure 3) is now open and allows a portion of the cold blast to enter the stove. The cold blast air in the stove, that is, stove 2 according to the example being discussed, now builds up pressure inasmuch as the other openings are all closed.

When the internal pressure of the stove is above a predetermined differential from the pressure of the furnace side of the hot blast valve (which differential may be in the neighborhood of one pound per square inch or less) the relay 2DP will close and thereby complete the control circuit to cause the contactor 2HBVO to close its contacts 2HBVO3, 2HBVO4 and 2HBVO5 to energize the motor of the hot blast valve to open said valve (Figure 2). The circuit is from 2SVP10 (Figure 14B) through 2SVP11 (Figure 14C), 2CBV5, 2SCT12 ("Auto." position), 2DP1, 2HBV2, coil 2HBVOC to line L2. The opening motion of the hot blast valve (on stove 2 according to the example being discussed) is caused to stop when the hot blast valve reaches its widest open position by the opening of the contact 2HBV2 carried by the multipole cam switch 28 (Figure 2). Opening of the hot blast valve and consequent movement of this multipole cam switch has caused contact 2HBV5 (Figure 14C) to close, thereby completing the control circuit to the contactor coil 2CBVOC. Energization of the operating coil 2CBVOC of said contactor will result in the closure of contacts 2CBVO1, 2CBVO2 and 2CBVO3 (Figure 12) connecting the motor of the cold blast valve across the 3 phase circuit disclosed in Figure 12, causing said cold blast valve to open until the motion is stopped when fully opened by the opening of the contact 2CBV1 (Figure 14C) carried by the multipole cam switch 39 (Figure 3). No. 2 stove is now on blast and will remain so until manipulation of the hand control wheel 115 and corresponding push buttons on the master panel of No. 2 stove, or in the event of an emergency, until the turning of the selector switch 124 to its "Close" position.

This emergency action will close the cold blast valve, through circuit 2ECBV1 (Figure 14A), 2CBV4 and 2CBVCC, and with its complete closure, the hot blast valve will automatically close through circuit 2CBV2, 2CVOR1, 2ECBV2, 2SCT2 (Auto.), 2HBV1, and coil 2HBVCC to line L2. Resetting of this emergency switch 124 to the "Reset" position will return the equipment to the condition it was in before the emergency arose.

With No. 1 stove and No. 2 stove on blast, it is now possible to remove No. 1 stove from the blast operation and put this stove on gas for reheating of the brick work. The pointer on the handwheel 115 (Figure 10) on No. 1 stove master panel is turned to the No. 6 position (stove on gas) and the push button 122b entitled "Initiate gas period" is pressed and released. The contacts of this push button are in the control circuit with the coil 1CBVCC, Fig. 13A, and the resulting energization of this coil causes the closure of the contacts 1CBVC2, 1CBVC3 and 1CBVC4 (Fig. 12) resulting in the energization of the motor to close the cold blast valve 1CBV (Figures 1 and 3). The control sequence is as follows:

Circuit may be traced from the conductor L1 on Fig. 13A through the multipole cam switch contacts 2HBV8 and 2CBV8 through the push button contact 1IGP1, thence through contact 1SVP1 to the "Auto." side of the stove control transfer switch 1SCT1, thence through multipole cam switch contact 1CBV4 to the contactor coil 1CBVCC to the conductor L2. When the cold blast valve is completely closed, the contact 1CBV2 on the multipole cam switch 39 will close and circuit is now complete from the conductor L1 through these contacts and thence through the normally closed cold blast valve opening relay contact 1CVOR1 through the stove valve program contact 1SVP2 through contact 1SCT2, thence through the multipole cam switch contact 1HBV1, through the contactor coil 1HBVCC to the conductor L2. Closure of the contacts 1HBVC2, 1HBVC3 and 1HBVC4 (Fig. 12) results in the energization of the motor to move the hot blast valve 1HBV (Figures 1 and 2) to closed position. With the closure of the hot blast valve a control circuit is completed through contacts 1CBV2 and 1HBV3, thence through the contacts of relays 1BSI1, 2BSI1, 3BSI1 through 1SVP3 to the normally closed contact 1SP1, thence through the "Auto." side of the transfer switch 1SCT3 to the multipole cam switch contact 1BOV1, thence through the blow-off valve open coil 1BOVOC to the conductor L2. Closure of the contacts 1BOVO1, 1BOVO2 and 1BOVO3 (Fig. 12) causes the blow-off valve 1BOV (Figures 1 and 5) to open and allows the pressure within the stove (stove No. 1 under the example being discussed) to diminish to zero.

When the stove pressure has decreased to zero, the relay 1SP will close, thereby closing its normally open contact 1SP2 (Figure 13A). The closure of this contact 1SP2 completes the control circuit through the transfer switch "Auto." side 1SCT5 through 1SVP5 either 1SCT6 "Auto." side or 1SCT7 "Auto." side, to the multipole cam switch contacts 1LCV1, or 1RCV1, respectively, thence through the contactor coils 1LCVOC or 1RCVOC, respectively, to the conductor L2. The resulting closures of the contacts 1LCVO2, 1LCVO3, 1LCVO4, 1RCVO2, 1RCVO3 and 1RCVO4 causes the left chimney valve and the right chimney valve to open (Figures 1, 4 and 12).

When the chimney valves have reached their maximum open positions, the multipole cam switch contacts 1LCV1 and 1RCV1 will open to stop the respective valve movements. When the left chimney valve is fully open, the multipole cam switch contact 1LCV2 (Figure 13B) is closed and thereby completes a control circuit to the contactor coil 1BOVCC, the energization of which causes the blow-off valve 1BOV (Figures 1, 5 and 12) to close. The multipole cam switch contact 1BOV2 will open when the blow-off valve reaches its maximum closed position, thereby deenergizing the motor of said valve.

The stove door 1SD on stove No. 1 (Figures 1 and 7) may be removed from the gas port on No. 1 stove and the burner extension spool 71 (Figure 6) may be moved into position at that port. The gas supply valve 1GV may now be opened and the burner blower motor 74 (Figure 6) may be started.

According to the present invention, the stove burner blowers are interlocked with the remainder of the mechanism to prevent injury to man or equipment. This safety feature is accomplished by preventing the stove attendant from starting the blower motor on any stove until the respective stove chimney valves are wide open and the blow-off and hot blast valves are closed. The control circuit for this feature is as follows: Circuit may be traced from the conductor L1 to the manually operable selector switch contact 1BB1 (Figure 13C) of the selector switch 123 on Figure 10 which is now in "run" position. Continuing with the tracing of this circuit, said circuit may be traced through the multipole cam switch contacts of the blow-off valve 1BOV6, through the contacts 1CVOR5, through the contacts 1HBVCR4 to the relay coil 1BRC and the conductor L2. The resulting closure of the relay contacts 1BR1 will cause the contactor 1B on Figure 12 to close, resulting in the starting of the burner blower (Figure 6). No. 1 stove is now on gas. The control sequence for putting No. 2 stove and No. 3 stove on gas is identical to the sequence discussed above.

The control scheme, according to the present invention, is so planned that one of the stoves must be on blast at all times during the normal operating cycle. With No. 2 stove on blast and No. 1 stove and No. 3 stove on gas, the operating cycle may now call for removing No. 2 stove from blast and putting No. 3 stove on blast. However, it is necessary that the attendant put No. 3 stove on blast before it is possible to remove No. 2 stove from blast. The control sequence for putting No. 3 stove on blast is identical to the sequence for No. 2 stove.

*Second procedure—bottling-up.*—As previously pointed out, it may be found necessary in some phases of the stove cycle to bottle up one of the stoves that is on gas. Assuming that No. 1 stove is on gas, the control sequence for bottling up this stove is as follows:

The gas supply that is feeding that stove must be shut off, the burner blower stopped and the burner extension spool retracted so that the stove door can be moved into its closed position. The handwheel 115 on the master panel MP for No. 1 stove is now turned so that the pointer 116 is located at position "Bottle-up stove" and the adjacent push button 122e (Bottle-up stove) is pressed and released. A control circuit has now been completed from the conductor L1 through the multipole cam switch contacts 1CBV2 and 1HBV3 (Figure 13A) through the limit switch contact 1SDC1 (Figure 13B) through the contact 1BUS2 of the push button 122e (Bottle-up stove) through the contacts 1SCT9, "Auto." position, or 1SCT10, "Auto." position, respectively, through switch 1RCV3 or switch 1LCV3 to the contactor coils 1RCVCC or 1LCVCC to conductor L2, thereby causing the closure of the chimney valves of this No. 1 stove. With the chimney valves closed this No. 1 stove is now bottled-up. No. 1 stove can now be returned to gas by turning handwheel 115 on the master panel MP of No. 1 stove so that the pointer thereof is at position "Stove on gas," thereby again opening the chimney valves as heretofore explained. The stove door of No. 1 stove may now be moved out of position and the burner extension spool may be moved into extended position. The gas supply valve may be opened and the burner blower may be started. This No. 1 stove can also be put on blast if desired by turning the handwheel 115 on the master panel MP of the No. 1 stove so that the pointer thereof is at position "Stove on blast" and by pressing and releasing the adjacent push button 122a. This will cause opening of the cold blast pilot plate 41 (Figure 3), the hot blast valve 1HBV (Figure 2) and the cold blast valve 1CBV (Figure 3) as heretofore explained. The procedure for bottling up No. 2 stove or No. 3 stove is identical to that discussed above in connection with No. 1 stove.

*Third procedure—back-drafting.*—The electrical control sequence for using a stove for back-drafting is as follows:

It may be assumed that No. 1 stove is on blast, No. 2 stove is on gas and No. 3 stove is on gas. The stove to be used for back-drafting may be either No. 2 stove or No. 3 stove since according to the present invention it is impossible to use No. 1 stove due to the fact that it was on blast prior to the need for back-drafting. It may be assumed that No. 2 stove is selected for back-drafting. The control sequence for the back-drafting of No. 2 stove is as follows:

The dial pointer on the master panel MP on No. 1 stove will be turned to position "Bottle-up stove." The dial pointer on the master panel MP on No. 2 stove will be turned to position "Back-draft." The dial pointer on the master panel MP of No. 3 stove will be turned to position "Bottle-up stove." It is necessary for the gas supply to the burner of No. 3 stove to be shut off, the burner blower stopped and the stove door put into the position for closing the stove opening. As No. 2 stove is to be used for back-drafting, the gas supply to the burner for this stove must be shut off and this burner blower must be stopped. However, the stove door on No. 2 stove must be left open to allow for the suction of air.

Push button 122e (Bottle-up stove) on the master panel for No. 3 stove is now pressed and released and control circuit is completed from the conductor L1 through the multipole cam switch contacts 3CBV2, 3HBV3 (Figure 15A), thence through the limit switch on the stove door 3SDC1 (Fig. 15B) through the contacts 3BUS2 of push button 122e through switches 3SCT10 or 3SCT19, through switch 3LCV3 or 3RCV3 through the contactor coils 3RCVCC and 3LCVCC to the conductor L2 (Figure 15, part B).

The energization of the coils 3RCVCC and 3LCVCC causes the closure of contacts 3RCVC2, 3RCVC3, 3RCVC4, 3LCVC2, 3LCVC3 and 3LCVC4 (Figure 12) resulting in the energization of the operating motors for the right and left chimney valves of stove No. 3 closing said valves. The multipole cam switch contacts 3RCV3 and 3LCV3 for the right and left chimney valves, respectively, will open when said chimney valves are completely closed, thereby stopping the supply of current to the motors of these valves.

Closure of the stove door of No. 3 stove causes the closure of relay 3SDCR (Figure 15B) through circuit 3SDC1 and 3SDCRC which relay will stay closed during the duration of the back-drafting operation. The No. 3 stove is now bottled up and there is no chance of transmitting air through No. 3 stove to the flue 14 (Figure 1).

The push button No. 122e (Bottle-up stove) on the master panel MP for No. 1 stove is now pressed and released, completing a control circuit from the conductor L1 through contacts 1MSV1, (Figure 13A), 1HBVOR1, 2BDR1, 2BVC1 and 3BVC1, thence through the contact 1CBVOR1 and through the closing coil 1BSRC of the latch relay 1BSR. This latch relay will stay closed even though the operating coil thereof is deenergized until the trip coil 1BSRTC is energized to unlatch the relay and cause it to drop open. With the closure of the relay contact 1BSR1 (Figure 13A), circuit is completed from the conductor L1 through contact 1BSR1 to the operating coil 1CBVCC, causing the closure of the cold blast valve 1CBV. With the closure of the cold blast valve 1CBV, multipole cam switch contact 1CBV2 (Figure 13A) is closed, completing a circuit from conductor L1 through contacts 1CVOR1 and 1SVP2 through the contactor coil 1HBVCC to the conductor L2, thereby energizing the motor to close the hot blast valve 1HBV. Stove No. 1 is now bottled up.

The push button 122c (Initiate back-draft) on the master panel MP for No. 2 stove is now pressed and released, completing a control circuit from the conductor L1 through the limit switch 2BN1 (Figure 14C), contacts 2BDR3, 2MSV2, 2SDCR2, 2CVOR3, 2BOVCR2, 2CBVCR1, 1SDCR2, 1CVCR1, 1BOVCR2, 1BVC2, 3SDCR2, 3CVCR2, 3BOVCR2 and 3BVC2, thence through the push button contact 2IBD1 of push button 122c (Initiate back-draft) to the contact 2HBV2 to the contactor coil 2HBVOC, resulting in the energization of the motor to open the hot blast valve 2HBV on No. 2 stove.

Closure of the hot blast valve 2HBV on No. 2 stove results in the closure of contact 2HBVO2 which will complete the circuit for the contactor coil 2HBVOC so that that coil is kept energized after the push button is released. The hot blast valve is now open on No. 2 stove. The stove door has been left open when the burner was stopped and the chimney valves are open so that a natural draft is now present, drawing away the gases from the blast furnace and allowing them to burn in this back-draft stove, utilizing their heat values and removing the hazard to the equipment and to the workmen around the blast furnace.

To stop the back-draft process the attendant need only press the button 122d (Stop back-drafting) on the master panel MP for the No. 2 stove. The control circuit completed by this action may be traced from the conductor L1 through the multipole cam switch contact 2CBV2 (Fig. 14A), contact 2CVOR2 through the contact 2SBD1 of the push button 122d through the contactor coil 2HBVCC to the conductor L2. This results in the energization of the motor for closing the hot blast valve 2HBV. No. 2 stove can now be put back on gas if desired.

No. 1 stove must be returned to blast and the control sequence is as follows: The handwheel 115 on the master panel MP for No. 1 stove is moved so that the pointer thereon is at position "Stove on blast," causing the relay 2BDR, Fig. 14B, to open due to the fact that contact 1SVP4 is open. Pressing of the push button 122a on the panel MP for No. 1 stove will complete a circuit from the conductor L1 through the contacts 1LCV4 (Figure 13B), 1RCV4, the normally closed contacts of 1ECBV3 of the switch 124 when it is in its reset position, multipole cam switch contact 1BOV3 and the normally closed contacts 2BSR1 and 3BSR1. Inasmuch as the latch relay 1BSR is still latched closed, the relay 1BS1 is open and the tracing of the control circuit may be continued through contacts 3HBVCR1, 2HBVCR1 through the contact 1SVP10 multipole cam switch, contact 1HBV7, transfer switch contacts 1SCT11, 1SCT15, Fig. 13C, to the push button contacts 1IBP1 (Initiate blast period), Fig. 13B, to the contact 1CBV3 to the contactor coil 1CBPOC to conductor L2, causing energization of the motor to open the cold blast valve to the pilot position, that is, so that the pilot plate 41 (Figure 3) is open. As the pressure in the stove builds up to a value almost equal to the pressure of the furnace side of the hot blast valve, relay 1DP (Figure 13C) will close, thereby completing a circuit through contacts 1DP1 allowing contactor 1HBVO to close, resulting in the energization of the motor of the hot blast valve to open said valve as explained under previous paragraph heading entitled "Description of the function of the electrically controlled circuits—First procedure—changing stove."

As the hot blast valve opens and consequently the cold blast valve opens, the relay 1BSR will be unlatched by the action of the control circuit completed to the trip coil 1BSRT (Figure 13C) of the relay 1BSR. This unlatching circuit may be traced from the conductor L1 through the contacts 1CBVOR2, 1HBVOR3, through the contact 1SCT14 of the transfer switch through the normally closed contacts 2BDR3, 3BDR2, the contact 1BSR2, through the trip coil 1BSRTC to the conductor L2, thereby unlatching said relay IBSR.

The procedure for putting any other stove on back-draft is identical with the procedure above described in connection with stove No. 2. According to the present invention any stove may be put on the furnace and used for back-drafting except the stove that was being used for blast just prior to the need for back-drafting.

*Fourth procedure—emergency blast shut off.*— The switch 124 located on the master panel MP for each of the stoves provides means for the emergency closure of the cold blast valve for its particular stove. This switch is mounted under glass which discourages inadvertent manipulation. Referring to No. 1 stove, for example, the contacts IECBVI will be closed when the switch 124 is turned to the "closed" position. The control circuit is traced from conductor LI through the contacts IECBVI (Fig. 13A) through the multipole cam switch contacts ICBV4 to the contactor coil ICBVCC, thence to conductor L2. Closure of the contactor ICBVC will cause the operating motor of the cold blast valve ICBV to turn in the direction to close the cold blast valve. Motion of the valve is stopped by the opening of multipole cam switch contacts ICBV4 when said valve is in completely closed position. Therefore in an emergency it is possible, by turning the button 124 to the "closed" position, to cancel all interlocking circuits hereinabove described and the motor of the cold blast valve on the stove on blast is actuated at once to close said valve. Turning of this rotary switch 124 to the "reset" position will restore the control circuits to the normal operating cycle.

Though certain preferred embodiments of the present invention have been described in detail, many modifications will occur to those skilled in the art. It is intended to cover all such modifications that fall within the scope of the appended claims.

What is claimed is:

1. In a blast furnace installation, in combination, a hot blast main adapted to be connected to a blast furnace, a plurality of hot blast stoves, each equipped with a hot blast valve, a cold blast valve, chimney valves and a blow-off valve, and drive means for said valves, said stoves being equipped also with gas burners and stove doors, a cold blast main connected to said stoves through their corresponding cold blast valves, a control assembly co-operatively associated with each of said stoves, each of said control assemblies including a stove program switch for its respective stove, each of said stove program switches being adapted to be positioned selectively to predetermine step by step actions in sequence or groups of such actions in sequence of said drive means, contactors and relays for controlling the operation of said drive means, all of said burners, stove doors and chimney valves being provided with limit switch elements adapted to be positioned in an electric circuit which must be completed in combination with a predetermined setting of the program switch of the stove before the drive means for the chimney valves of that stove can be energized, whereby to prevent the establishment of a back draft through that stove until the burner, stove doors and chimney valves of the other stoves are closed.

2. In a blast furnace installation, in combination, a hot blast main adapted to be connected to a blast furnace, a plurality of hot blast stoves, each equipped with a hot blast valve, a cold blast valve, chimney valves and a blow-off valve, and drive means for said valves, said stoves being equipped also with gas burners and stove doors, a cold blast main connected to said stoves through their corresponding cold blast valves, a control assembly co-operatively associated with each of said stoves, each of said control assemblies including a stove program switch for its respective stove, each of said stove program switches being adapted to be positioned selectively to predetermine step by step actions in sequence or groups of such actions in sequence of said drive means, contactors and interlocking relays for controlling the operation of said drive means, means for insuring, after a back drafting operation, restoration to on-blast condition of only that stove, which, prior to said backdrafting operation, was in an on-blast condition, said on-blast condition being attained through the appropriate positioning of the cold blast and hot blast valves of said stove, said means comprising a latching type relay associated with each stove, said latching type relay being adapted to be energized and thereby latched closed only by a first predetermined setting of its corresponding program switch from an on-blast position to a bottle-up position to allow backdrafting through any other stove, said latching type relay including a trip coil the energization of which unlatches said latching type relay, said latching type relay, when closed, cooperating with said interlocking relays, contactors and predetermined settings of said program switches to prevent the completion of circuits to the drive means of the cold blast valve of any stove except that stove the latching type relay of which is closed, said trip coil of said latching type relay being energized after back-drafting, to release said latching type relay, only by a second predetermined setting of said corresponding program switch from said bottle-up position to said on-blast position; limit switches responsive to the position of and associated with each hot blast valve and each cold blast valve of each stove adapted to cooperate with said interlocking relays, contactors, and said closed latching type relay to establish a circuit in combination with said second predetermined setting of said program switch to said trip coil to energize the same thereby unlatching said latching type relay and simultaneously completing a circuit to control the drive means for the cold blast valve and the hot blast valve of the corresponding stove to open the same.

3. In a blast furnace installation, in combination, a hot blast main adapted to be connected to a blast furnace, a plurality of hot blast stoves, each equipped with a hot blast valve, a cold blast valve, chimney valves and a blow-off valve, and drive means for said valves, said stoves being equipped also with gas burners and stove doors, a cold blast main connected to said stoves through their corresponding cold blast valves, a control assembly co-operatively associated with each of said stoves, each of said control assemblies including a pressure switch corresponding to each of said stoves, which pressure switch is responsive to the difference between pressure within its corresponding stove and atmospheric pressure, each of said control assemblies also including a stove program switch for its respective stove, each of said stove program switches being adapted to be positioned selectively to predetermine step by step actions in sequence or groups of such actions in sequence of said drive means, contactors and relays for controlling the operation of said drive means, each of said program switches being interlocked with the pressure switch of its respective stove, each of said pressure switches being adapted to complete an electric circuit to control the drive means of the chimney valves of said stoves whereby to prevent the opening of the chimney valves of said stove until the stove pressure has been reduced to approximately atmospheric pressure.

4. In a blast furnace installation, in combination, a hot blast main adapted to be connected to a blast furnace, a plurality of hot blast stoves, each equipped with a hot blast valve, a cold blast valve, chimney valves and a blow-off valve, and drive means for said valves, said stoves being equipped also with gas burners and stove doors, a cold blast main connected to said stoves through their corresponding cold blast valves, a control assembly co-operatively associated with each of said stoves, each of said control assemblies including a stove program switch for its respective stove, each of said stove program switches being adapted to be positioned selectively to predetermine step by step actions in sequence or groups of such actions in sequence of said drive means, contactors and interlocking relays for controlling the operation of said drive means, all of said burners, stove doors and chimney valves being provided with limit switch elements responsive to the positions of said burners, doors and valves, which limit switch elements must be positioned in a predetermined manner to complete an electric circuit in combination with said interlocking relays and contactors and a predetermined backdraft setting of the program switch of one of the stoves in order to energize the drive means for the chimney valves of that stove, said interlocking relays cooperating with the program switches of all the stoves and said contactors when said limit switch elements are in said position to prevent the opening of any chimney valve except on the stove which has its program switch set on backdraft.

5. In a blast furnace installation, in combination, a hot blast main adapted to be connected to a blast furnace, a plurality of hot blast stoves, each equipped with a hot blast valve, a cold blast valve, chimney valves and a blow-off valve, and electrically operated drive means for said valves, said stoves being equipped also with gas burners and stove doors, a cold blast main connected to said stoves through their corresponding cold blast valves, a control assembly co-operatively associated with each of said stoves, each of said control assemblies including a stove program switch for its respective stove, each of said stove program switches being adapted to be positioned selectively to predetermine step by step actions in sequence or groups of such actions in sequence of said drive means, contactors and interlocking relays for controlling the operation of said drive means, limit switches on said hot and cold blast valves responsive to the positions of said hot and cold blast valves, which limit switches are adapted when said hot and cold blast valves are in predetermined positions to cooperate with said interlocking relays and contactors, to complete a circuit through the corresponding program switches to open the chimney valves of any one of said stoves only when the hot and cold blast valves of that stove are in a closed position.

6. In a blast furnace installation, in combination, a hot blast main adapted to be connected to a blast furnace, a plurality of hot blast stoves, each equipped with a hot blast valve, a cold blast valve, chimney valves and a blow-off valve, and electrically operated drive means for said valves, said stoves being equipped also with gas burners and stove doors, a cold blast main connected to said stoves through their respective cold blast valves, a control assembly co-operatively associated with each of said stoves, each of said control assemblies including a stove program switch for its respective stove, each of said stove program switches being adapted to be positioned selectively to predetermine step by step actions in sequence or groups of such actions in sequence of said drive means, contactors and interlocking relays for controlling the operation of said drive means the chimney valves of each stove being provided with limit switches responsive to the position of said chimney valves which limit switches are adapted when said chimney valves are in predetermined positions to complete a circuit through their corresponding program switches, said interlocking relays and said contactors to control and operate the burner of the corresponding stove only when the chimney valves of said stove are in an open position.

7. In a blast furnace installation, in combination, a hot blast main adapted to be connected to a blast furnace, a plurality of hot blast stoves, each equipped with a hot blast valve, a cold blast valve, chimney valves and a blow-off valve, and drive means for said valves, said stoves being equipped also with gas burners and stove doors, a cold blast main having a snort valve therein, and being connected to said stoves through their respective cold blast valves, a cold blast by-pass main having therein a cold blast mixer valve with drive means therefor, said by-pass main being connected to said hot blast main, a control assembly co-operatively associated with each of said stoves, each of said control assemblies including a stove program switch for its respective stove, each of said stove program switches being adapted to be positioned selectively to inaugurate step by step actions in sequence or groups of such actions in sequence of said drive means, contactors and interlocking relays for controlling the operation of said drive means, said interlocking relays being responsive to the positions of said valves, stove doors, stove burners and said program switches, each of said valves, said stove doors and said stove burners being provided with limit switches responsive to the positions of said valves, stove doors and stove burners, said limit switches being positioned, when the valves, stove doors, stove burners and program switches of any one of said stoves is in an on-gas condition and the valves, stove doors, stove burners and program switches of the other stoves are in a bottle-up position, to cooperate with said program switches, said interlocking relays and said contactors when the setting of the program switch of said any one of said stoves is changed from said on-gas position to backdraft position to complete a circuit to and control the drive means of the hot blast valve of said any one of said stoves to open said hot blast valve, hence placing said any one of said stoves in backdraft condition, at least one of said interlocking relays and limit switches, when one of said stoves is in a condition other than an on-gas condition, preventing the completion of a circuit to the drive means of the hot blast valve of said stove to open the same for backdrafting when the program switch of said stove is turned to a backdraft position.

8. In a blast furnace installation, in combination, a hot blast main adapted to be connected to a blast furnace, a plurality of hot blast stoves, each equipped with a hot blast valve, a cold blast valve, chimney valves and a blow-off valve, and drive means for said valves, said stoves being equipped also with gas burners and stove doors, a cold blast main having a snort valve therein, and being connected to said stoves through their respective cold blast valves, a cold blast by-pass main having therein a cold blast mixer valve with drive means therefor, said by-pass main being connected to said hot blast main, a control assembly cooperatively associated with each of said stoves, each of said control assemblies including a stove program switch for its respective stove, each of said stove program switches being adapted to be positioned selectively to predetermine step by step actions in sequence or groups of such actions in sequence of said drive means, contactors and interlocking relays for controlling the operation of said drive means, means for insuring, after a backdrafting operation, the restoration to on-blast condition of only that stove, which, prior to said backdrafting operation was in an on-blast condition, said on-blast condition being attained through the predetermined positioning of the cold blast and hot blast valves of said any stove, said means comprising limit switches on each hot and cold blast valve responsive to the positions of said hot and cold blast valves, said limit switches being adapted to be positioned after said backdrafting operation to cooperate with said contactors, interlocking relays and predetermined settings of said program switches to complete an electrical circuit through said interlocking relays, contactors and said predetermined settings of said program switches, to control the drive means of the hot and cold blast valves of said any stove to open said hot and cold blast valves and to prevent the completion of circuits to the drive means of the hot and cold blast valves of any other stove.

9. In a blast furnace installation, in combination, a hot blast main adapted to be connected to a blast furnace, a plurality of hot blast stoves, each equipped with a hot blast valve, a cold blast valve, chimney valves and a blow-off valve, and drive means for said valves, said stoves being equipped also with gas burners and stove doors, a cold blast main having a snort valve therein, and being connected to said stoves through their respective cold blast valves, a cold blast by-pass main having therein a cold blast mixer valve with drive means therefor, said by-pass main being connected to said hot blast main, a control assembly co-operatively associated with each of said stoves, each of said control assemblies including a stove program switch for its respective stove, each of said stove program switches being adapted to be positioned selectively to predetermine step by step actions in sequence or groups of such actions in sequence of said drive means, contactors and interlocking relays for controlling the operation of said drive means, an operational switch for each of said stoves, each of said program switches being interlocked through said interlocking relays with its corresponding operational switch, said snort valve being provided with a position-responsive switch which in combination with said program switches, said interlocking relays and said contactors is adapted to complete a circuit to control the drive means of the hot blast valve of any stove to be used for backdrafting, whereby it is assured that said snort valve is open to atmosphere and is closed to access of air to the furnace through the cold blast main before backdrafting can proceed.

10. In a blast furnace installation, in combination, a hot blast main adapted to be connected to a blast furnace, a plurality of hot blast stoves, each equipped with a hot blast valve, a cold blast valve, chimney valves and a blow-off valve, and drive means for said valves, said stoves being equipped also with gas burners and stove doors, a cold blast main having a snort valve therein, and being connected to said stoves through their respective cold blast valves, a cold blast by-pass main having therein a cold blast mixer valve with drive means therefor, said by-pass main being connected to said hot blast main, a control assembly co-operatively associated with each of said stoves, each of said control assemblies including a stove program switch for its respective stove, each of said stove program switches being adapted to be positioned selectively to predetermine step by step actions in sequence or groups of such actions in sequence of said drive means, contactors and relays for controlling the operation of said drive means, an operational switch for each stove, interlocking relays, each of said program switches being interlocked through said interlocking relays with its corresponding operational switch, said mixer valve being provided with a position-responsive switch which in combination with said program switches and said interlocking relays is adapted to complete a circuit to control the drive means of said hot blast valve of a stove whereby it is assured that the corresponding stove is prevented from being put into back drafting condition before said mixer valve is closed.

11. In a blast furnace installation, in combination, a hot blast main adapted to be connected to a blast furnace, a plurality of hot blast stoves, each equipped with a hot blast valve, a cold blast valve, chimney valves and a blow-off valve, and drive means for said valves, said stoves being equipped also with gas burners and stove doors, a cold blast main having a snort valve therein and being connected to said stoves through their respective cold blast valves, a cold blast by-pass main having therein a cold blast mixer valve with drive means therefor, said by-pass main being connected to said hot blast main, a control assembly co-operatively associated with each of said stoves, each of said control assemblies including a stove program switch for its respective stove, each of said stove program switches being adapted to be positioned selectively to predetermine step by step actions in sequence or groups of such actions in sequence of said drive means, contactors and interlocking relays for controlling the operation of said drive means, an operational switch for each stove, each of said program switches being interlocked through said interlocking relays with its corresponding operational switch, said snort valve being provided with a position-responsive switch which in combination with said program switches, said interlocking relays and said contactors is adapted to complete a circuit to control the drive means of said hot blast valve of any stove whereby to prevent said stove from being put into backdrafting condition before said snort valve is open to the atmosphere and closed to access of air to the furnace through the cold blast main.

12. In a blast furnace installation, in combination, a hot blast main adapted to be connected to a blast furnace, a plurality of hot blast stoves, each equipped with a hot blast valve, a cold blast valve, chimney valves and a blow-off valve, and electrically operated drive means for said valves, said stoves being equipped also with gas burners and stove doors, a cold blast main connected to said stoves through their corresponding cold blast valves, a cold blast by-pass main having therein a cold blast mixer valve with drive means therefor, said by-pass main being connected to said hot blast main, a control assembly co-operatively associated with each of said stoves, each of said control assemblies including a stove program switch for its respective stove, each of said stove program switches being adapted to be positioned selectively to predetermine step by step actions in sequence or groups of such actions in sequence of said drive means, contactors and interlocking relays for controlling the operation of said drive means, said cold blast valve of each stove being provided with a limit switch responsive to the position of said cold blast valve which limit switch in combination with said program switches and said interlocking relays is adapted to complete a circuit to control the drive means of its corresponding hot blast valve to open said hot blast valve hence placing its corresponding stove in backdraft operation, only when said cold blast valve is in a closed position.

13. In a blast furnace installation, in combination, a hot blast main adapted to be connected to a blast furnace, a plurality of hot blast stoves, each equipped with a hot blast valve, a cold blast valve, chimney valves and a blow-off valve, and drive means for said valves, said stoves being equipped also with gas burners and stove doors, a cold blast main connected to said stoves through their corresponding cold blast valves, a cold blast by-pass main having therein a cold blast mixer valve with drive means therefor, said by-pass main being connected to said hot blast main, a control assembly co-operatively associated with each of said stoves, each of said control assemblies including a stove program switch for its respective stove, each of said stove program switches being adapted to be positioned selectively to predetermine step by step actions in sequence or groups of such actions in sequence of said drive means, contactors and relays for controlling the operation of said drive means, an operational switch for each of said stoves, interlocking relays, each of said program switches being interlocked through said interlocking relays with its corresponding operational switch, each of said stove doors and each of said chimney valves being provided with a position-responsive switch which in combination with said program switches and said interlocking relays is adapted to complete a circuit to control the drive means of said hot blast valve of a corresponding stove whereby said stove is prevented from being put in back drafting position unless the stove doors and chimney valves of the other stoves have been closed.

14. In a blast furnace installation, in combination, a hot blast main adapted to be connected to a blast furnace, a plurality of hot blast stoves, each equipped with a hot blast valve, a cold blast valve, chimney valves and a blow-off valve, and drive means for said valves, said stoves being equipped also with gas burners and stove doors, a cold blast main connected to said stoves through their corresponding cold blast valves, a cold blast by-pass main having therein a cold blast mixer valve with drive means therefor, said by-pass main being connected to said hot blast main, a control assembly co-operatively associated with each of said stoves, each of said control assemblies including a stove program switch for its respective stove, each of said stove program switches being adapted to be positioned selectively to predetermine step by step actions in sequence or groups of such actions in sequence of said drive means, contactors and relays for controlling the operation of said drive means, an operational switch for each of said stoves, interlocking relays, each of said program switches being interlocked through said interlocking relays with its corresponding operational switch, each of said blow-off valves being provided with a position-responsive switch which in combination with said program switches and said interlocking relays is adapted to complete a circuit to control the drive means of the hot blast valve of the corresponding stove for preventing said stove from being put in back drafting condition unless the blow-off valves of all of the stoves have been closed.

15. In a blast furnace installation, in combination, a hot blast main adapted to be connected to a blast furnace, a plurality of hot blast stoves, each equipped with a hot blast valve, a cold blast valve, chimney valves and a blow-off valve, and drive means for said valves, said stoves being equipped also with gas burners and stove doors, a cold blast main connected to said stoves through their corresponding cold blast valves, a cold blast by-pass main having therein a cold blast mixer valve with drive means therefor, said by-pass main being connected to said hot blast main, a control assembly co-operatively associated with each of said stoves, each of said control assemblies including a stove program switch for its respective stove, each of said stove program switches being adapted to be positioned selectively to predetermine step by step action in sequence or groups of such actions in sequence of said drive means, contactors and relays for controlling the operation of said drive means, an operational switch for each of said stoves, interlocking relays, each of said program switches being interlocked through said interlocking relays with its corresponding operational switch, the chimney valves of each of said stoves being provided with a position-responsive switch which in combination with said program switches and said interlocking relays is adapted to complete a circuit to control the drive means of the hot blast valve of the corresponding stove to prevent such stove from being put in back drafting condition unless the chimney valves of said stove have been opened.

16. In a blast furnace installation, in combination, a hot blast main adapted to be connected to a blast furnace, a plurality of hot blast stoves, each equipped with a hot blast valve, a cold blast valve, chimney valves and a blow-off valve, and drive means for said valves, said stoves being equipped also with gas burners and stove doors, a cold blast main connected to said stoves through their corresponding cold blast valves, a cold blast by-pass main having therein a cold blast mixer valve with drive means therefor, said by-pass main being connected to said hot blast main, a control assembly co-operatively associated with each of said stoves, each of said control assemblies including a stove program switch for its respective stove, each of said stove program switches being adapted to be positioned selectively to predetermine step by step actions in sequence or groups of such actions in sequence of said drive means, contactors and relays for controlling the operation of said drive means, an operational switch for each of said stoves, interlocking relays, each of said program switches being interlocked through said interlocking relays with its corresponding operational switch, each of said stove doors being provided with a position-responsive switch which in combination with said program switches and said interlocking relays is adapted to complete a circuit to control the drive means of the hot blast valve of the corresponding stove for preventing the opening of the hot blast valve of said stove for initiating back drafting unless the stove door of that stove is at least partially open.

17. In a blast furnace installation, in combination, a hot blast main adapted to be connected to a blast furnace, a plurality of hot blast stoves, each equipped with a hot blast valve, a cold blast valve, chimney valves and a blow-off valve, and drive means for said valves, said stoves being equipped also with gas burners and stove doors, a cold blast main connected to said stoves through their corresponding cold blast valves, a control assembly co-operatively associated with each of said stoves, each of said control assemblies including a stove program switch for its respective stove, each of said stove program switches being adapted to be positioned selectively to predetermine step by step actions in sequence or groups of such actions in sequence of said drive means, contactors and interlocking relays for controlling the operation of said drive means, all of said cold blast valves and hot blast valves being provided with limit switches responsive to the position of said cold blast valves and said hot blast valves, said switches being adapted, in combination with said program switches and relays, to complete a circuit to control the drive means for each of said cold blast valves to close said cold blast valves only when a cold blast valve of any other stove in the open position.

18. In a blast furnace installation, in combination, a hot blast main adapted to be connected to a blast furnace, a plurality of hot blast stoves, each equipped with a hot blast valve, a cold blast valve, chimney valves and a blow-off valve, and drive means for said valves, said stoves being equipped also with gas burners and stove doors, a cold blast main connected to said stoves through their corresponding cold blast valves, a cold blast by-pass having therein a cold blast mixer valve with drive means, said cold blast by-pass main being connected to said hot blast main, a control assembly co-operatively associated with each of said stoves, each of said control assemblies including a stove program switch for its respective stove, each of said stove program switches being adapted to be positioned selectively to predetermine step by step actions in sequence or groups of such actions in sequence of said drive means, contactors and relays for controlling the operation of said drive means, the doors of all of said stoves being provided with position-responsive switches adapted, in combination with said program switches and relays, to complete a circuit to control the drive means for each of said chimney valves to prevent the closure of the chimney valves of a stove unless the stove door of that stove is in closed position.

19. In a blast furnace installation, in combination, a hot blast main adapted to be connected to a blast furnace, a plurality of hot blast stoves, each equipped with a hot blast valve, a cold blast valve, chimney valves and a blow-off valve, and drive means for said valves, said stoves being equipped also with gas burners and stove doors, a cold blast main connected to said stoves through their corresponding cold blast valves, a cold blast by-pass main having therein a cold blast mixer valve with drive means, said cold blast by-pass main being connected to said hot blast main, a control assembly co-operatively associated with each of said stoves, each of said control assemblies including a stove program switch for its respective stove, each of said stove program switches being adapted to be positioned selectively to predetermine step by step actions in sequence or groups of such actions in sequence of said drive means, contactors and relays for controlling the operation of said drive means, an operational switch for each of said stoves, interlocking relays, each of said program switches being interlocked through said interlocking relays with its corresponding operational switch, each of said hot blast valves and each of said cold blast valves being provided with a position-responsive switch, which in combination with said program switches and said interlocking relays are adapted to complete a circuit to control the drive means of the chimney valves of a stove for preventing the closure of the chimney valves of the corresponding stove unless the hot blast valve and the cold blast valve of said stove are both in closed position.

20. In a blast furnace installation, in combination, a hot blast main adapted to be connected to a blast furnace, a plurality of hot blast stoves, each equipped with a hot blast valve, a cold blast valve, chimney valves and a blow-off valve, and drive means for said valves, said stoves being equipped also with gas burners and stove doors, a cold blast main connected to said stoves through their corresponding cold blast valves, a control assembly co-operatively associated with each of said stoves, each of said control assemblies including a stove program switch for its respective stove, each of said stove program switches being adapted to be positioned selectively to predetermine step by step actions in sequence or groups of such actions in sequence of said drive means, contactors and relays for controlling the operation of said drive means, an operational switch for each of said stoves, interlocking relays, each of said program switches being interlocked through said interlocking relays with its corresponding operational switch, each of said blow-off valves being provided with a position-responsive switch which, in combination with said program switches and said interlocking relays, is adapted to complete a circuit to control the drive means of the corresponding cold blast valve of a stove for preventing the opening of the cold blast valve of said stove before said blow-off valve is closed.

21. In a blast furnace installation, in combination, a hot blast main adapted to be connected to a blast furnace, a plurality of hot blast stoves, each equipped with a hot blast valve, a cold blast valve, each of said cold blast valves being provided with a pilot valve element, chimney valves and a blow-off valve, and drive means for said valves, said stoves being equipped also with gas burners and stove doors, a cold blast main connected to said stoves through their corresponding cold blast valves, a control assembly co-operatively associated with each of said stoves, each of said control assemblies including a stove program switch for its respective stove, each of said stove program switches being adapted to be positioned selectively to predetermine step by step actions in sequence or groups of such actions in sequence of said drive means, contactors and relays for controlling the operation of said drive means, an operational switch for each of said stoves, interlocking relays, each of said program switches being interlocked through said interlocking relays with its corresponding operational switch, each of said hot blast valves being provided with a position-responsive switch which, in combination with said program switches and said interlocking relays, is adapted to complete a circuit to control the drive means of the corresponding cold blast valve to prevent the opening of the corresponding cold blast valve beyond the pilot-open position of said cold blast valve until said hot blast valve is opening.

22. In a blast furnace installation, in combination, a hot blast main adapted to be connected to a blast furnace, a plurality of hot blast stoves, each equipped with a hot blast valve, a cold blast valve, chimney valves and a blow-off valve, and drive means for said valves, said stoves being equipped also with gas burners and stove doors, a cold blast main connected to said stoves through their corresponding cold blast valves, a control assembly co-operatively associated with each of said stoves, each of said control assemblies including a stove program switch for its respective stove, each of said stove program switches being adapted to be positioned selectively to predetermine step by step actions in sequence or groups of such actions in sequence of said drive means, contactors and relays for controlling the operation of said drive means, a pressure responsive switch for each stove responsive to pressure differential between the interior of the corresponding stove and the interior of the hot blast main, and an interlocking relay responsive to said pressure switch, each of said pressure switches being adapted to be positioned to complete a circuit through said program switches and said relays to control the drive means of the respective hot blast valve for preventing the opening of the hot blast valve of its stove before said stove is filled with air under approximately the same pressure as that in the hot blast main.

23. In a blast furnace installation, in combination, a hot blast main adapted to be connected to a blast furnace, a plurality of hot blast stoves, each equipped with hot blast valves, cold blast valves, chimney valves and blow-off valves, and drive means for said valves, said stoves being equipped also with gas burners and stove doors, a cold blast main connected to said stoves through their corresponding cold blast valves, a control assembly co-operatively associated with each of said stoves, each of said control assemblies including a stove program switch for its respective stove, each of said stove program switches being adapted to be positioned selectively to predetermine step by step actions in sequence or groups of such actions in sequence of said drive means, contactors and relays for controlling the operation of said drive means, an operational switch for each of said stoves, interlocking relays, each of said program switches being interlocked through said interlocking relays with its corresponding operational switch, the hot blast valve and the cold blast valve of each stove being provided with position-responsive switches adapted to complete a circuit through said program switches and said relays to control the drive means for said blow-off valves whereby to prevent the opening of the blow-off valve of a stove before the hot blast valve and cold blast valve of that stove are closed.

24. In a blast furnace installation, in combination, a hot blast main adapted to be connected to a blast furnace, a plurality of hot blast stoves, each equipped with a hot blast valve and a cold blast valve, and drive means for said valves, a control assembly co-operatively associated with each of said stoves, each of said control assemblies including a stove program switch for its respective stove, each of said stove program switches being adapted to be positioned selectively to predetermined step by step actions in sequence, or groups of such actions in sequence of said drive means, contactors and relays for controlling the operation of said drive means, and position-responsive switches responsive to the positions of said valves, the position-responsive switches of said cold blast valves being adapted to be positioned, in combination with said program switches, to complete a circuit to control the drive means of each of said cold blast valves to prevent the closure of all of said cold blast valves at any one instant, an emergency switch means associated with each of said stoves, each adapted to cancel said control and to complete an emergency circuit for the drive means of a corresponding cold blast valve to close said cold blast valve regardless of the position of any of the other cold blast valves.

OWEN R. RICE.
ARTHUR J. WHITCOMB.

REFERENCES CITED

The following references are of record in the file of this patent:

UNITED STATES PATENTS

| Number | Name | Date |
|---|---|---|
| 294,003 | Bennett | Feb. 26, 1884 |
| 303,207 | Bennett | Aug. 5, 1884 |
| 759,171 | Gaines | May 3, 1904 |
| 1,452,297 | Howland | Apr. 17, 1923 |
| 1,631,950 | Rappold | June 27, 1927 |
| 1,781,796 | Willcox | Nov. 18, 1930 |
| 1,816,174 | Brown | July 28, 1931 |
| 2,085,912 | Lencke | July 6, 1937 |
| 2,117,787 | Bock | May 17, 1938 |
| 2,163,762 | Noack | June 27, 1939 |
| 2,354,276 | Reece | July 25, 1944 |
| 2,417,049 | Bailey | Mar. 11, 1947 |
| 2,448,199 | Vobrath | Aug. 31, 1948 |